United States Patent
Agarwal et al.

(10) Patent No.: US 10,528,521 B2
(45) Date of Patent: Jan. 7, 2020

(54) CONSOLIDATION OF EXPIRED SNAPSHOTS USING COMPUTE ON CLOUD

(71) Applicant: RUBRIK, INC., Palo Alto, CA (US)

(72) Inventors: Arpit Agarwal, Mountain View, CA (US); Prudhvi Dharmana, Bangalore (IN); Venkata Ramana Sreevathsa Meesala, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 15/866,261

(22) Filed: Jan. 9, 2018

(65) Prior Publication Data

US 2019/0213267 A1    Jul. 11, 2019

(51) Int. Cl.
| | |
|---|---|
| G06F 16/11 | (2019.01) |
| G06F 9/455 | (2018.01) |
| G06F 3/06 | (2006.01) |
| G06F 11/14 | (2006.01) |

(52) U.S. Cl.
CPC .......... *G06F 16/128* (2019.01); *G06F 3/0643* (2013.01); *G06F 9/45558* (2013.01); *G06F 11/1458* (2013.01); *G06F 16/125* (2019.01); *G06F 2201/815* (2013.01); *G06F 2201/84* (2013.01)

(58) Field of Classification Search
CPC .. G06F 16/128; G06F 3/0643; G06F 9/45558; G06F 11/1458; G06F 2201/815; G06F 2201/84
See application file for complete search history.

(56) References Cited

U.S. PATENT DOCUMENTS

| | | | |
|---|---|---|---|
| 8,621,274 B1 * | 12/2013 | Forgette | G06F 11/203 |
| | | | 711/154 |
| 2004/0163009 A1 | 8/2004 | Goldstein et al. | |
| 2007/0208918 A1 | 9/2007 | Harbin et al. | |

(Continued)

FOREIGN PATENT DOCUMENTS

WO    2019139781    7/2019

OTHER PUBLICATIONS

"International Application Serial No. PCT US2018 067700, International Search Report dated May 2, 2019", 5 pages.

(Continued)

*Primary Examiner* — Masud K Khan

(74) *Attorney, Agent, or Firm* — Schwegman Lundberg & Woessner, P.A.

(57) ABSTRACT

Methods and systems for reclaiming disk space via consolidation and deletion of expired snapshots are described. The expired snapshots may comprise snapshots of a virtual machine that are no longer required to be stored within a data storage domain (e.g., a cluster of data storage nodes or a cloud-based data store). In some cases, rather than storing an incremental file corresponding with a particular snapshot of the virtual machine, a full image of the particular snapshot may be generated and stored within the data storage domain. The generation of the full image may allow a chain of dependencies supporting the expired snapshots to be broken and for the expired snapshots to be deleted or consolidated. The full image of the particular snapshot may be generated using compute capacity in the cloud or may be generated locally by a storage appliance and uploaded to the data storage domain.

20 Claims, 27 Drawing Sheets

(56) References Cited

U.S. PATENT DOCUMENTS

2008/0208927 A1* 8/2008 Chikusa ................ G06F 3/0605
2010/0049929 A1 2/2010 Nagarkar et al.
2015/0378636 A1 12/2015 Yadav et al.
2016/0124665 A1* 5/2016 Jain ........................ G06F 16/13
                                                                       711/162
2016/0342609 A1* 11/2016 Jibbe ................... G06F 11/1448

OTHER PUBLICATIONS

"International Application Serial No. PCT US2018 067700, Written Opinion dated May 2, 2019", 7 pages.

* cited by examiner

```
Virtual Machine A, Version V7 {
    pBase,         ⟶  /snapshots/VM_A/s5/s5.full
    pF1,           ⟶  /snapshots/VM_A/s6/s6.delta
    pF2            ⟶  /snapshots/VM_A/s7/s7.delta
}
```

```
Virtual Machine A, Version V2 {
    pBase,         ⟶  /snapshots/VM_A/s5/s5.full
    pR1,           ⟶  /snapshots/VM_A/s4/s4.delta
    pR2,           ⟶  /snapshots/VM_A/s3/s3.delta
    pR3            ⟶  /snapshots/VM_A/s2/s2.delta
}
```

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

Virtual Machine B, Version V1 {
    pBase,
    pR1,
    pR2,
    pF3
}

Virtual Machine C, Version V2 {
    pBase,
    pF1,
    pF5,
    pF6
}

FIG. 2H       FIG. 2I

Virtual Machine B, Version V1 {
    pBase2,
    pR11,
    pR12,
    pR1,
    pR2,
    pF3
}

Virtual Machine C, Version V2 {
    pBase2,
    pR11,
    pF5,
    pF6
}

Virtual Machine A, Version VS {
    pBaseA,
    pR4,
}

Virtual Machine A, Version VU {
    pBaseB,
    pR1,
    pR2,
    pR3
}

```
Virtual Machine A, Version VU {
    pBaseA,
    pF9
}
```

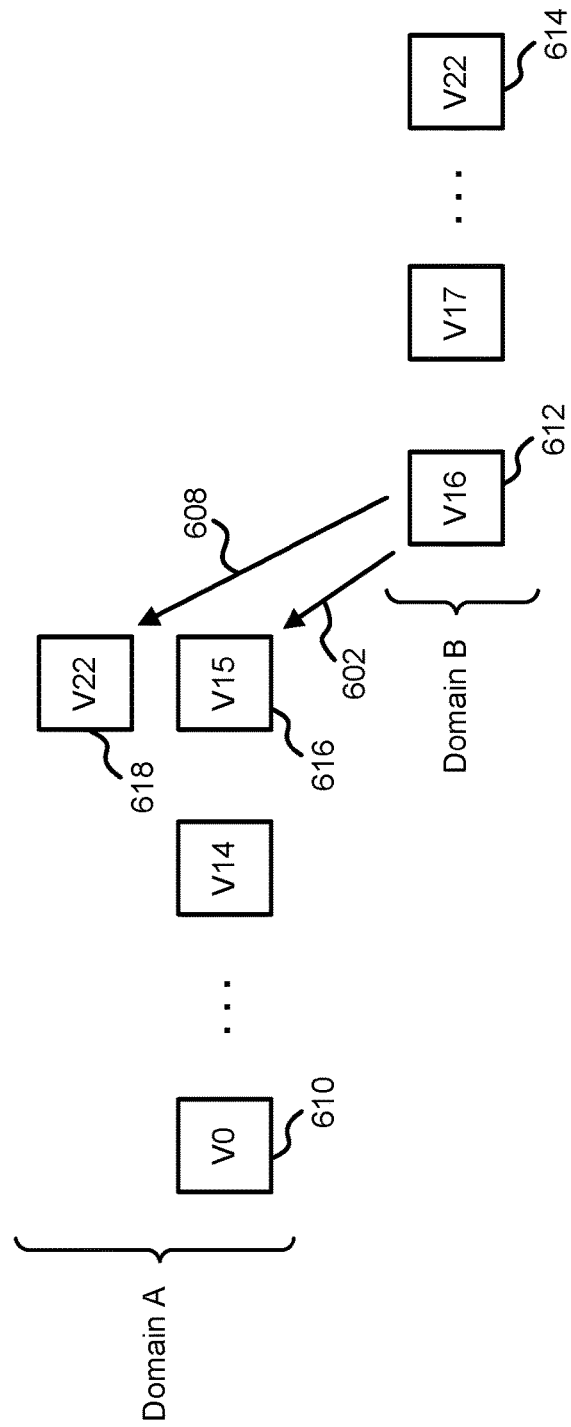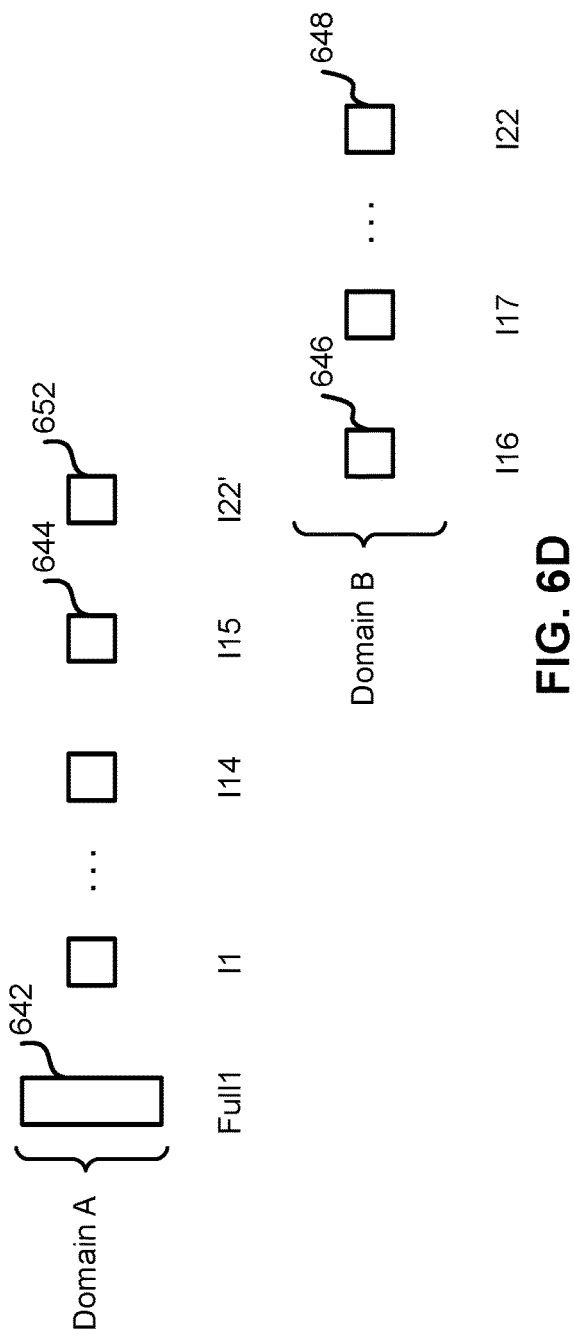

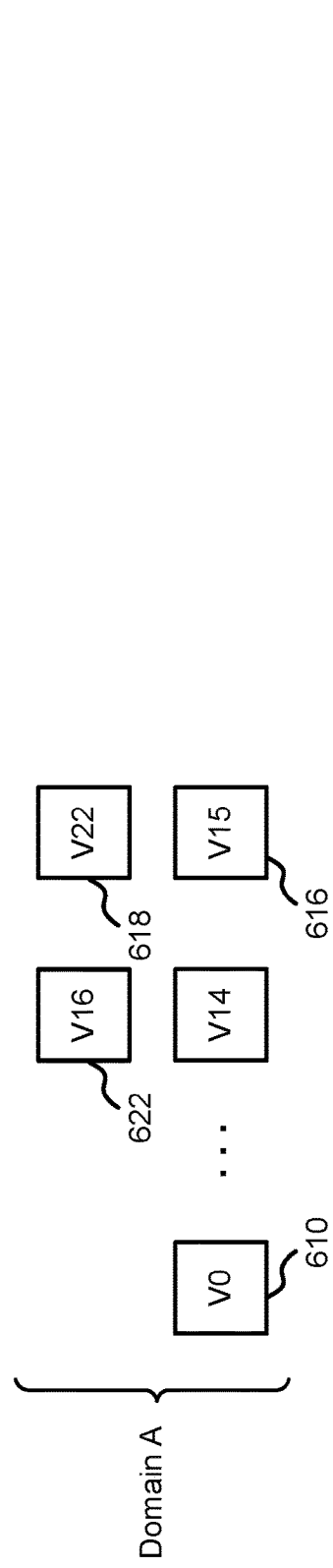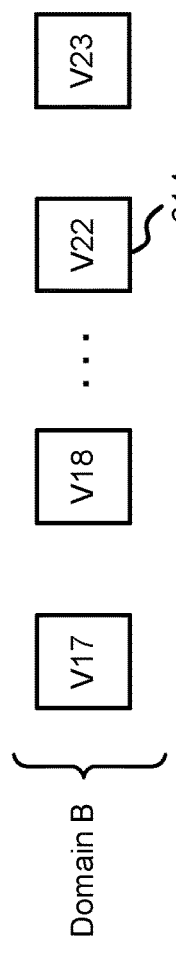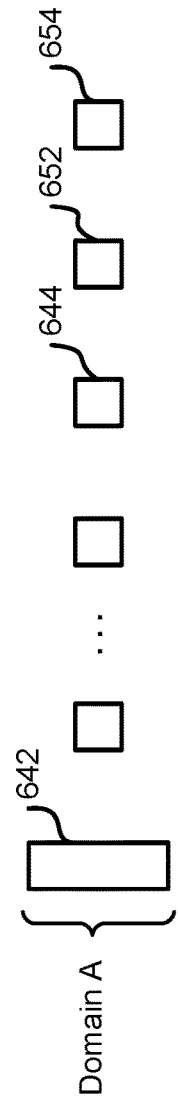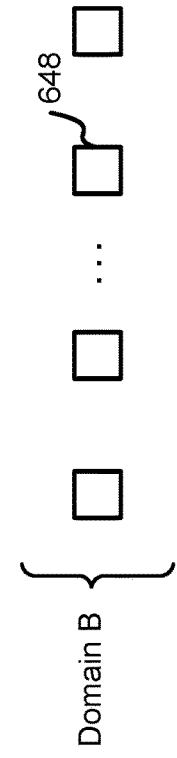
FIG. 6E
FIG. 6F

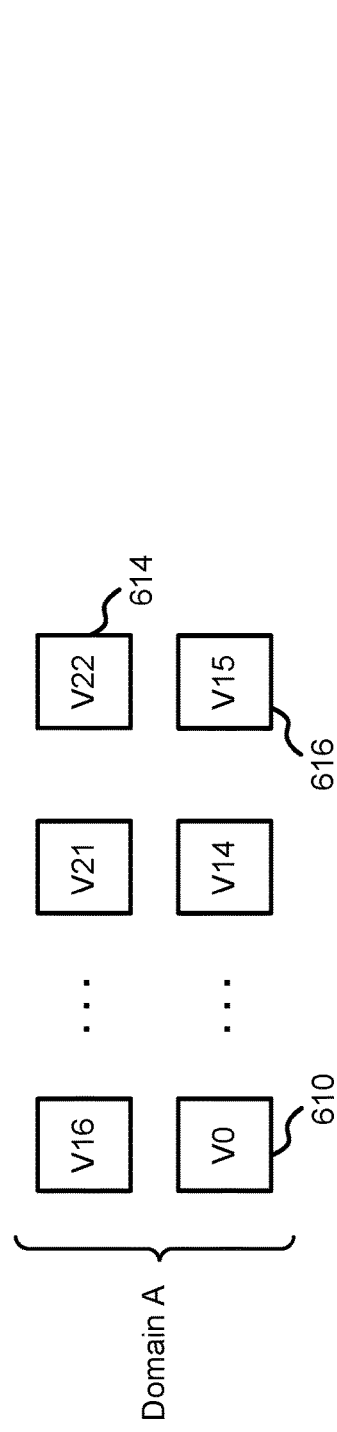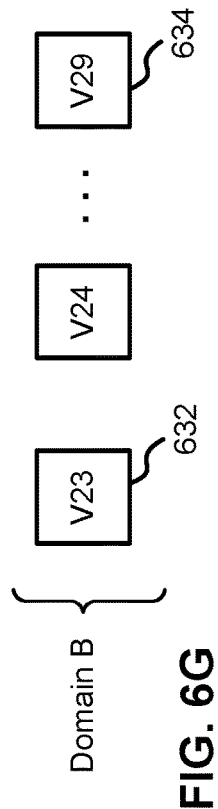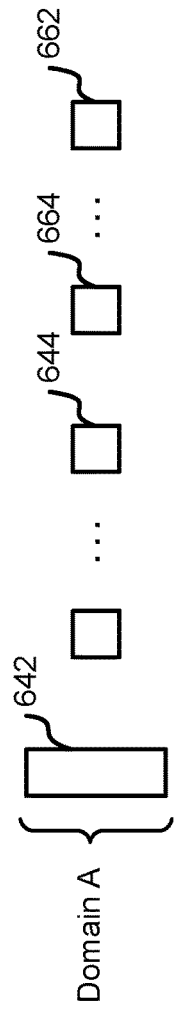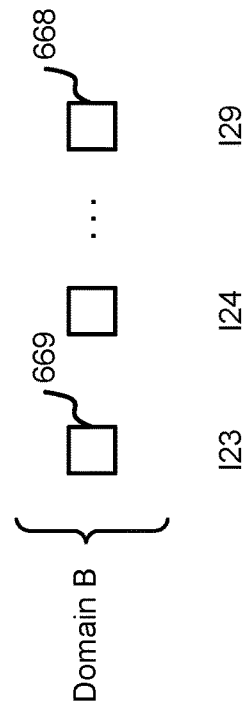
FIG. 6G
FIG. 6H

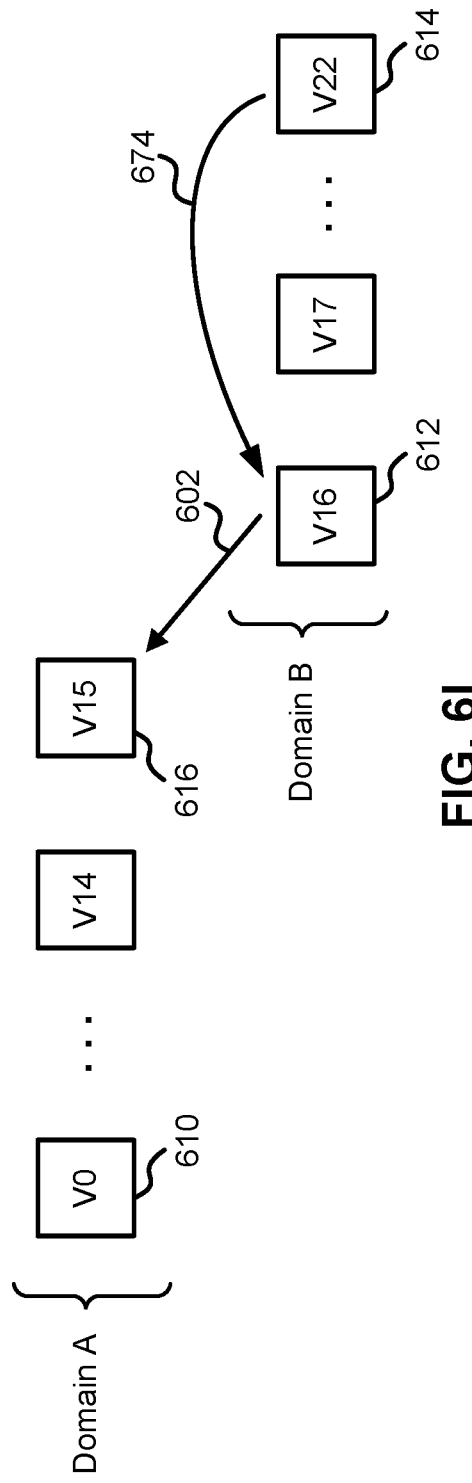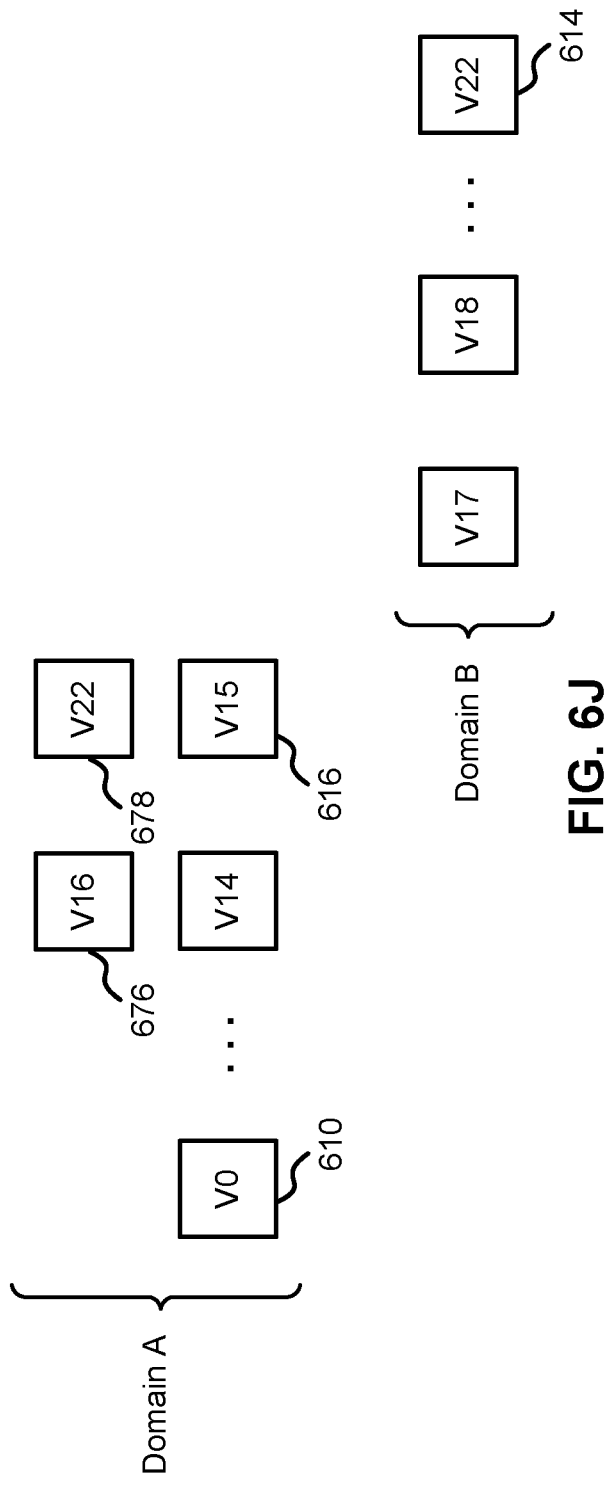

CONSOLIDATION OF EXPIRED SNAPSHOTS USING COMPUTE ON CLOUD

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIGS. 6A-6J depict various embodiments of different versions of a virtual machine and their corresponding electronic files stored using a first storage domain (Domain A) and a second storage domain (Domain B).

DETAILED DESCRIPTION

Figure 1A:
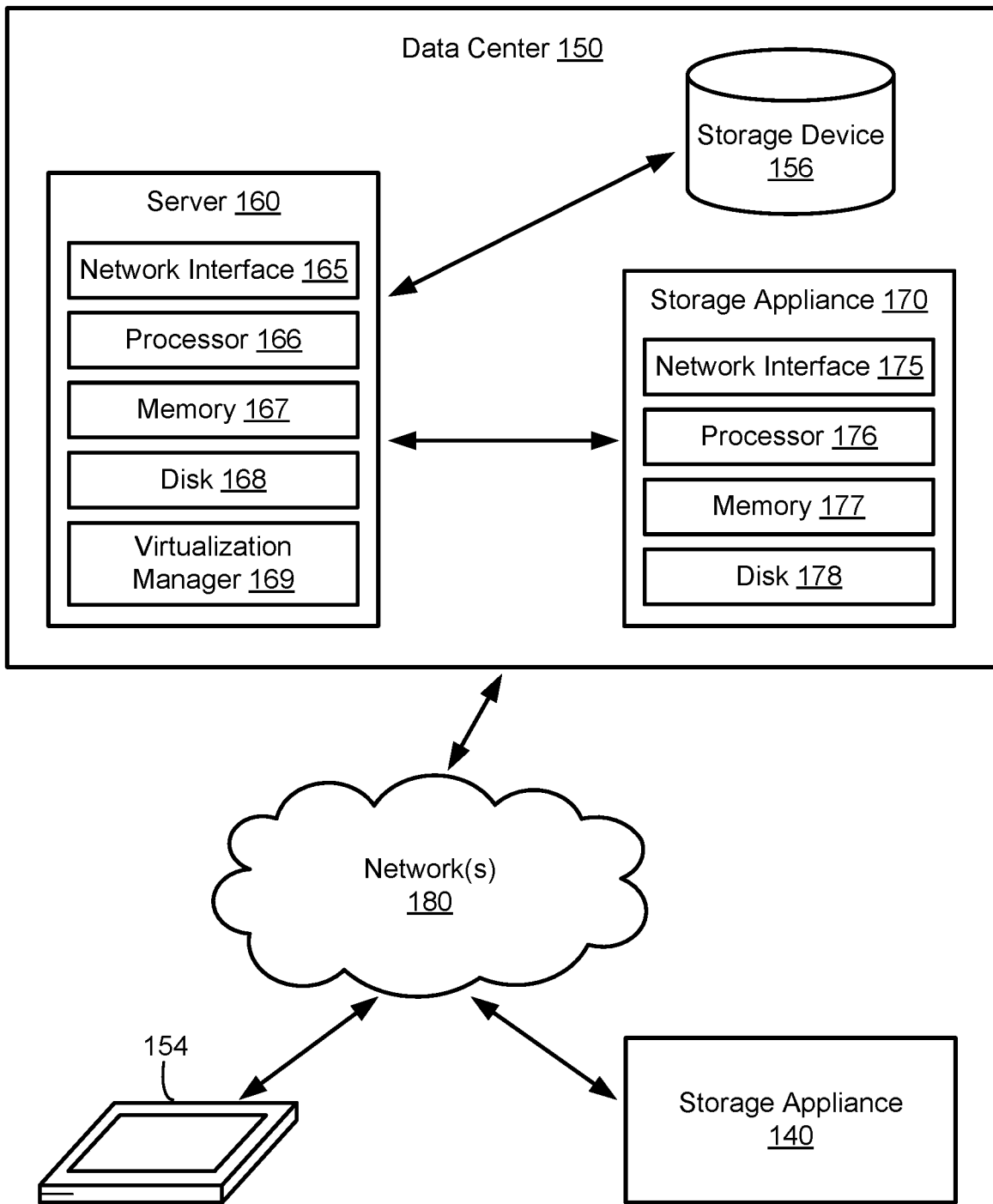
FIG. 1A depicts one embodiment of a networked computing environment.

Technology is described for reclaiming disk space by consolidating and/or deleting expired snapshots stored within a data storage domain. The data storage domain may correspond with a cluster of data storage nodes or an archival data source. The expired snapshots may comprise snapshots of a virtual machine, an application, a database, or an electronic file that are no longer required to be stored (e.g., the requirements of an SLA policy may no longer require that the snapshots be stored or recoverable). The snapshots may be stored or archived using an archival data store (e.g., an NFS datastore), cloud storage, object storage (e.g., data storage that manages or stores data as objects), or block storage. The archival data source may comprise an archival data store, a hardware data storage device, a storage area network storage device, a networked-attached storage device, or a cloud-based data storage system. The stored snapshots may include a full image snapshot and one or more incremental files that derive from the full image snapshot. Disk space within the data storage domain or on the archival data source may be reclaimed by either consolidating or merging consecutive expired snapshots or by deleting expired snapshots. In some cases, rather than archiving an incremental file corresponding with a particular snapshot, a full image of the particular snapshot may be generated and stored within the archival data source. The generation of the full image may allow a chain of dependencies supporting the expired snapshots to be broken and for the expired snapshots to be deleted or consolidated on the archival data source. The generation of full images may be performed periodically in order to reduce the size of the dependency chains for the archived snapshots. One benefit of reclaiming disk space by consolidating and/or deleting expired snapshots is that available disk space may be increased and the costs associated with storing the archived data may be reduced.

In one embodiment, a full image of a particular snapshot may be generated using compute resources accessible by an archival data source (e.g., compute on cloud capability may enable the instantiation of a virtual machine to generate the full image in the cloud). The particular snapshot stored within the archival data source may be identified based on a maximum dependency size for chains within the archival data source. In one example, the maximum dependency size for a chain may comprise a maximum of ten dependencies requiring that the maximum number of incrementals between any two full image snapshots is not more than nine incremental snapshots. The particular snapshot may be identified as the most recently uploaded snapshot to the archival data source or as the newest version of a virtual machine that is stored within the archival data store. In some cases, the determination of whether to generate the full image for the particular snapshot using compute resources (e.g., a virtual machine) or to keep an incremental snapshot may depend on the amount of available disk space, the total number of expired snapshots, and/or the combined data size for the expired snapshots. In one example, the full image for the particular snapshot may be generated in response to detecting that the total number of expired snapshots is greater than a threshold number of snapshots, that the amount of available disk space on the archival data source is below a threshold amount of disk space, and/or that the combined data size of the expired snapshots is greater than a threshold data size (e.g., more than 200 GB of disk space may be reclaimed on the archival data source if the full image for the particular snapshot is generated).

In another embodiment, rather than transferring an incremental file corresponding with a particular snapshot to an archival data source, a full image of the particular snapshot may be generated and uploaded to the archival data source (e.g., a local storage appliance may generate the full image and then transfer the full image to cloud storage). In one example, a full image snapshot may be generated and uploaded to the archival data source instead of an incremental file in response to detecting that a time difference between the current snapshot to be uploaded and the last uploaded full image snapshot is greater than a threshold period of time (e.g., it has been more than 30 days since the last full image snapshot was uploaded). In another example, the full image snapshot may be generated and uploaded to the archival data source in response to detecting that a number of archived snapshots between the current snapshot to be uploaded and the last uploaded full image snapshot is greater than a threshold number of snapshots (e.g., there have been more than 200 snapshots archived since the last full image snapshot was uploaded). In another example, the full image snapshot may be generated and uploaded to the archival data source in response to detecting that an accumulated data size of the archived snapshots uploaded since the last full image snapshot was uploaded is greater than a threshold data size (e.g., is greater than 1 TB or greater than the data size of the last uploaded full image snapshot). In another example, the full image snapshot may be generated and uploaded to the archival data source in response to detecting that a combined data size of prior incremental snapshots uploaded to the archival data source since the last uploaded full image snapshot is greater than a threshold data size (e.g., is greater than 500 GB) and/or more than a threshold time period has passed since the last full image snapshot was uploaded to the archival data source (e.g., more than 15 days have passed since the last full image snapshot was uploaded). In another example, the full image snapshot may be generated and uploaded to the archival data source in response to detecting that a change rate computed as the summation of the physical disk sizes of the incremental files uploaded to the archival data source since the last full image snapshot was uploaded divided by the physical disk size of the last full image snapshot is greater than a threshold percentage (e.g., is greater than 100% of the size of the last uploaded full image snapshot).

Technology is also described for managing the transfer of snapshot data between two different data storage domains. In some cases, snapshot data stored using a local data storage cluster may be transferred to cloud-based data storage or to a remote data storage cluster in order to store archived snapshot data or to allow non-archived snapshot data to be used by the cloud-based data storage or the remote data storage cluster. In one example, the most recent snapshot of a virtual machine (e.g., the last captured snapshot for the virtual machine) that has not yet been archived may be prematurely uploaded to cloud-based data storage or to the remote data storage cluster in order to facilitate testing or development using the most recent snapshot of the virtual machine. In this case, the most recent snapshot of the virtual machine may be transferred to cloud-based data storage or to the remote data storage cluster by transferring an out-of-order incremental file for the most recent version of the virtual machine.

An out-of-order incremental file may correspond with data differences between the most recent version of the virtual machine stored using a local data storage cluster (e.g., corresponding with the last captured snapshot of the virtual machine stored within a first data storage domain) and a second snapshot of the virtual machine stored using a remote data storage cluster (e.g., corresponding with the last uploaded snapshot of the virtual machine transferred to a second data storage domain). The most recent snapshot of the virtual machine may be associated with a first point in time version of the virtual machine and the second snapshot of the virtual machine may be associated with a second point in time version of the virtual machine that does not directly precede the first point in time version of the virtual machine. In one example, the most recent snapshot of the virtual machine may correspond with a tenth version of the virtual machine and the second snapshot of the virtual machine may correspond with a third version of the virtual machine. In this case, the out-of-order incremental file may comprise data differences between the tenth version of the virtual machine and the third version of the virtual machine. In contrast, an in-order incremental file may comprise data differences between the tenth version of the virtual machine and the ninth version of the virtual machine (i.e., the version of the virtual machine that directly precedes the tenth version of the virtual machine).

After the out-of-order incremental file has been transferred to the second data storage domain, a full image for the most recent snapshot of the virtual machine may be generated using a chain of snapshots that are already stored within the second data storage domain. The full image for the most recent snapshot of the virtual machine may be used to generate a virtual machine instance. One benefit of transferring out-of-order incremental files is that by leveraging the chain of snapshots that have already been archived or otherwise transferred to cloud-based data storage or to the remote data storage cluster, the most recent version of a virtual machine that has not yet been archived may be made available to computing resources within the cloud-based data storage or the remote data storage cluster with reduced upload time and reduced network congestion. Another benefit of transferring out-of-order incremental files is that future data transfers from the first data storage domain to the second data storage domain may leverage the additional out-of-order incremental files that were previously transferred to the second storage domain to reduce the data size of future incremental file transfers and to reduce the disk space required to store the archived snapshots of the virtual machine in the second data storage domain.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
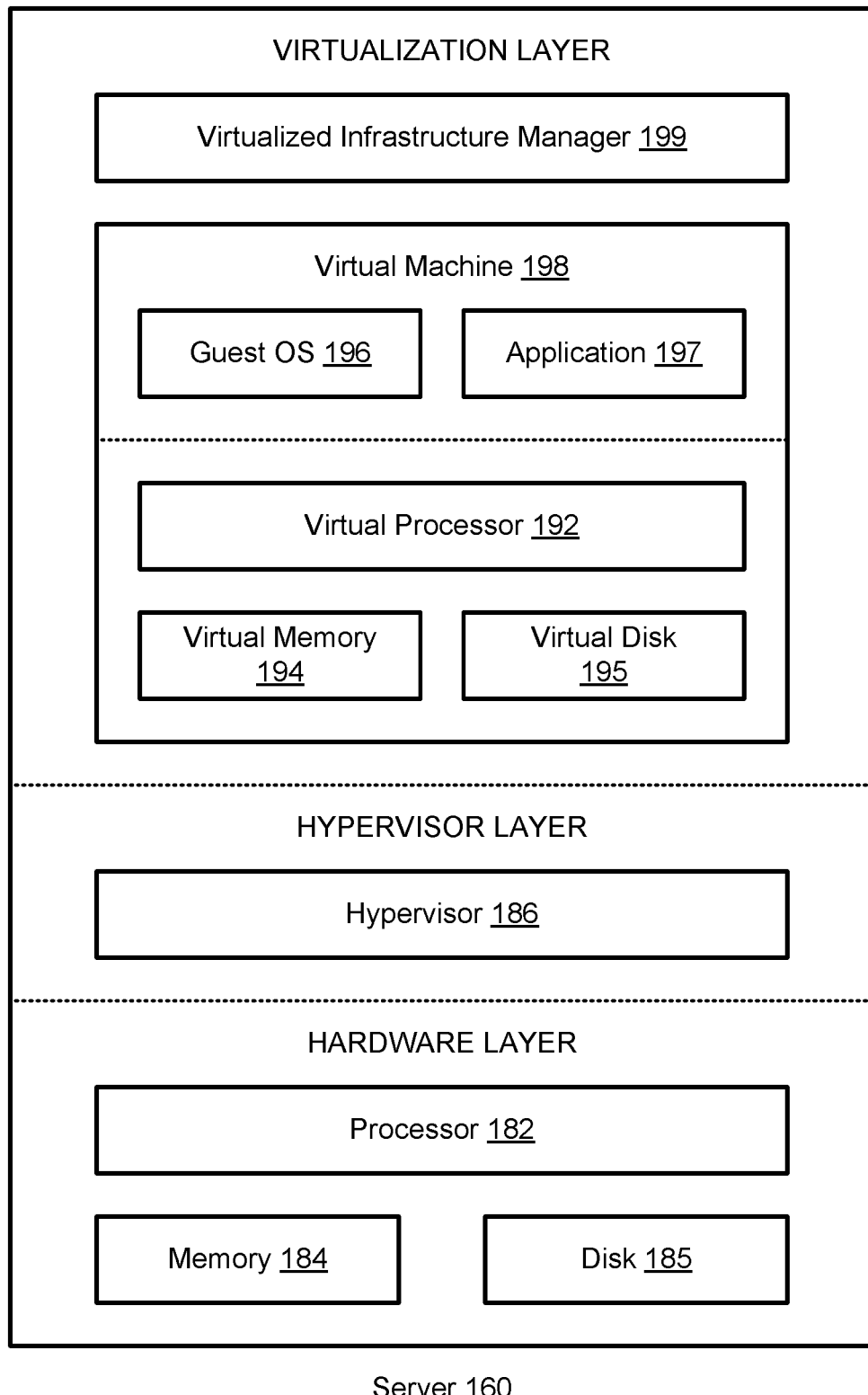
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
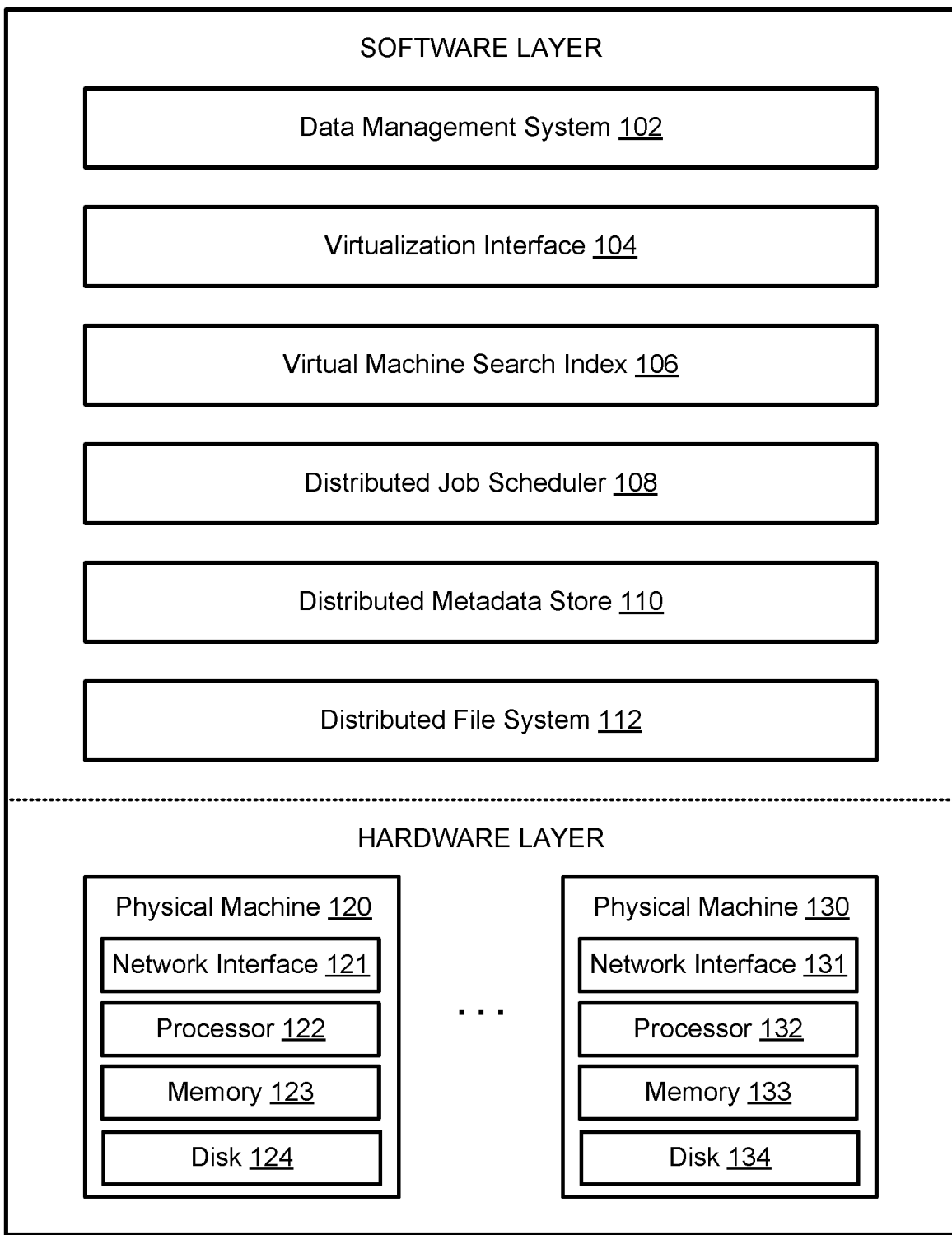
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
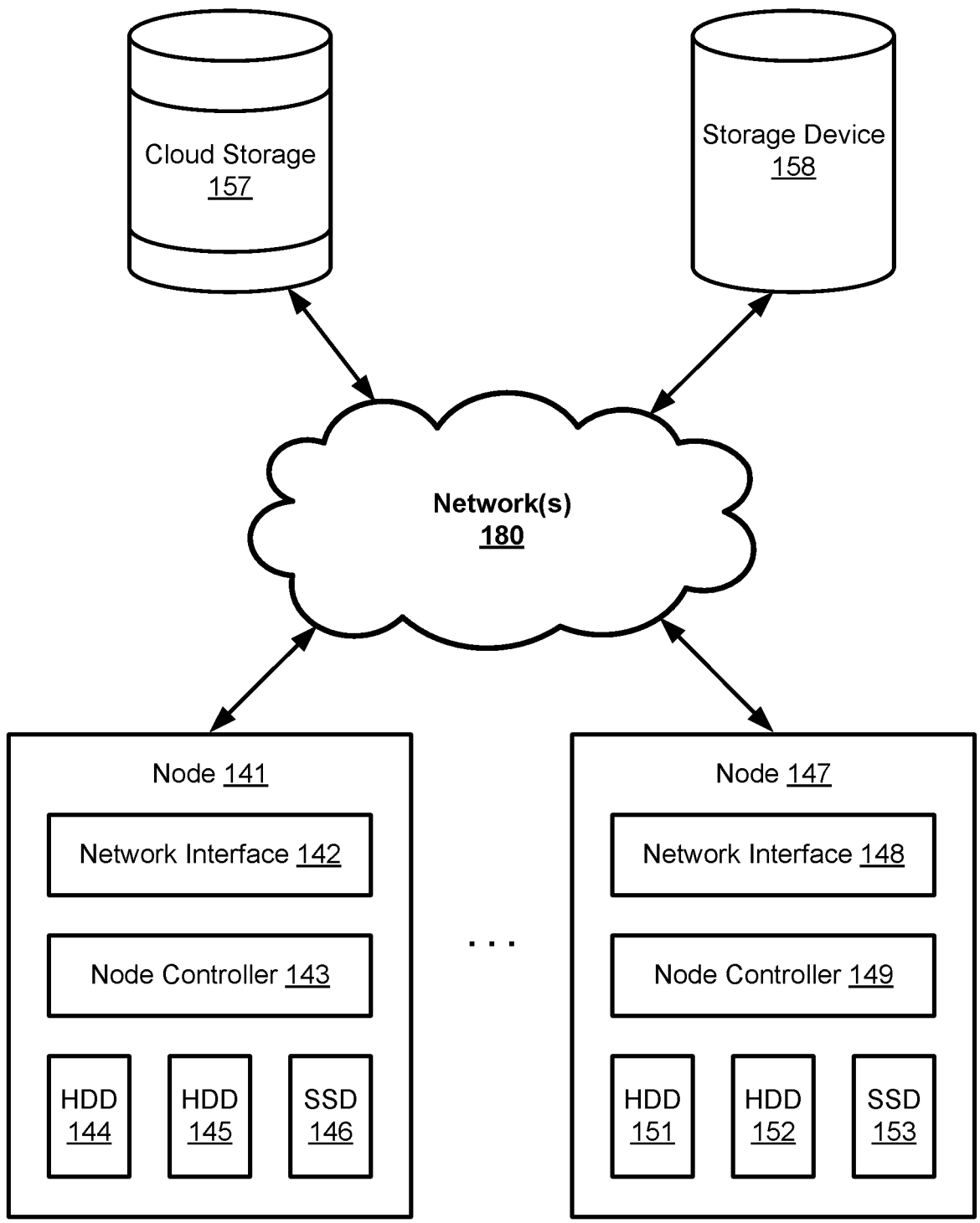
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2A, 2B, 2C:
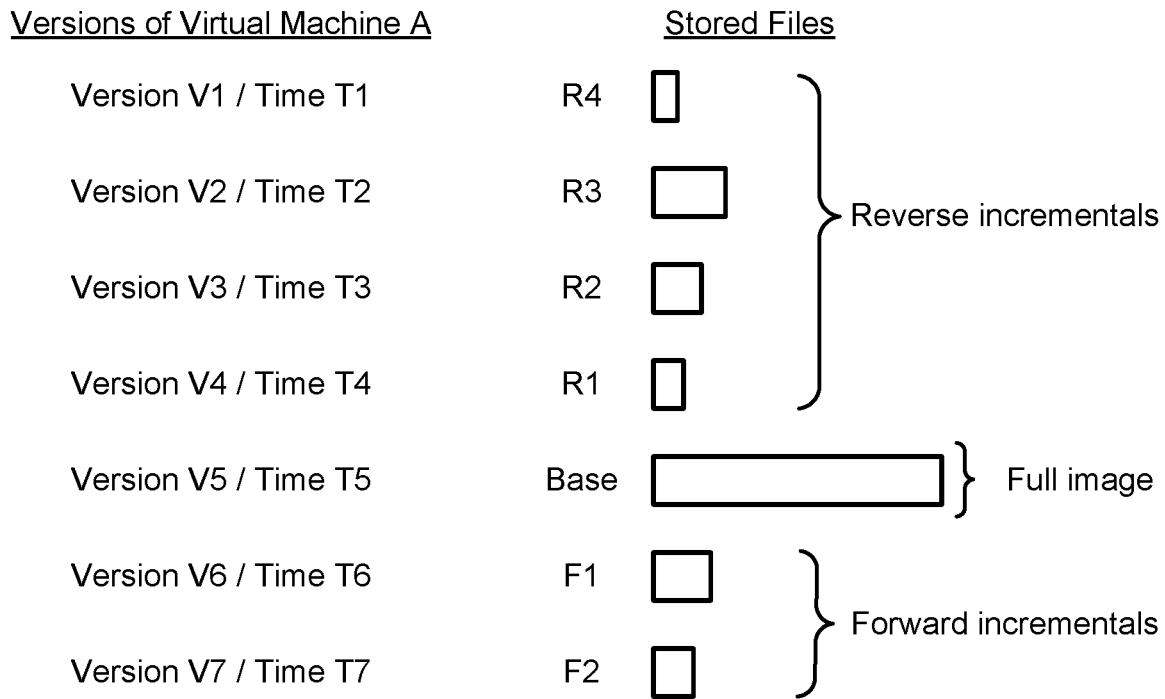
FIGS. 2A-2Q depict various embodiments of sets of files and data structures associated with managing and storing snapshots of virtual machines.
Figures 2D, 2E, 2F:
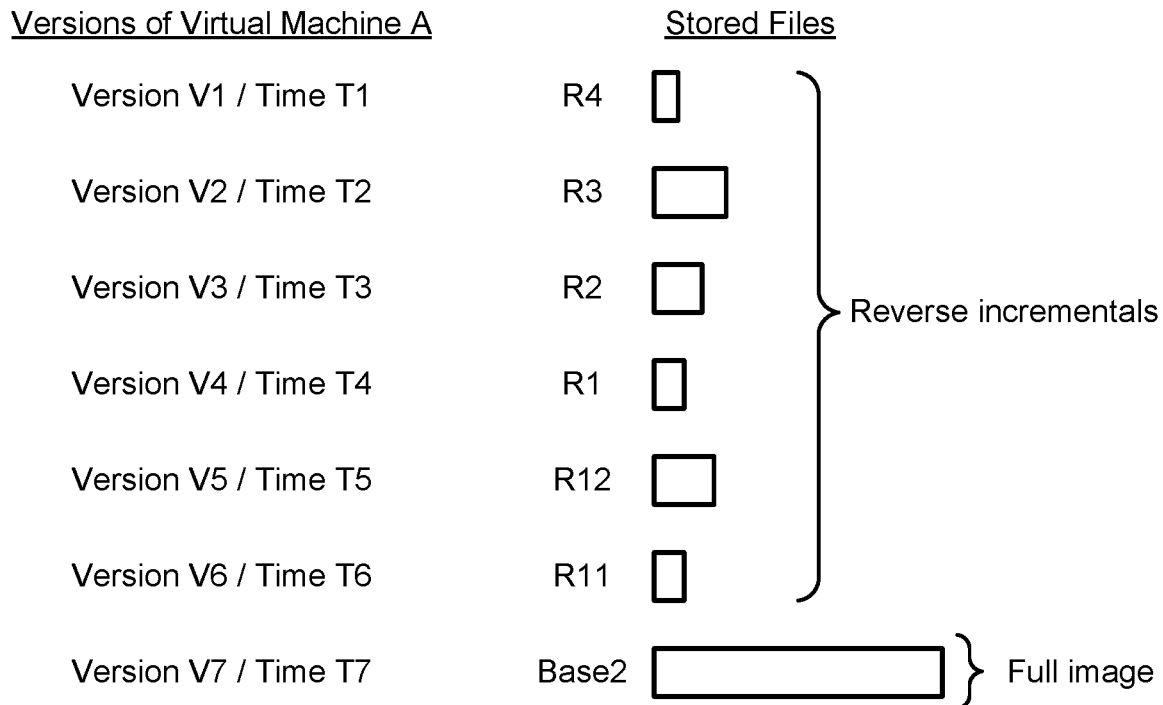
Figure 2G:
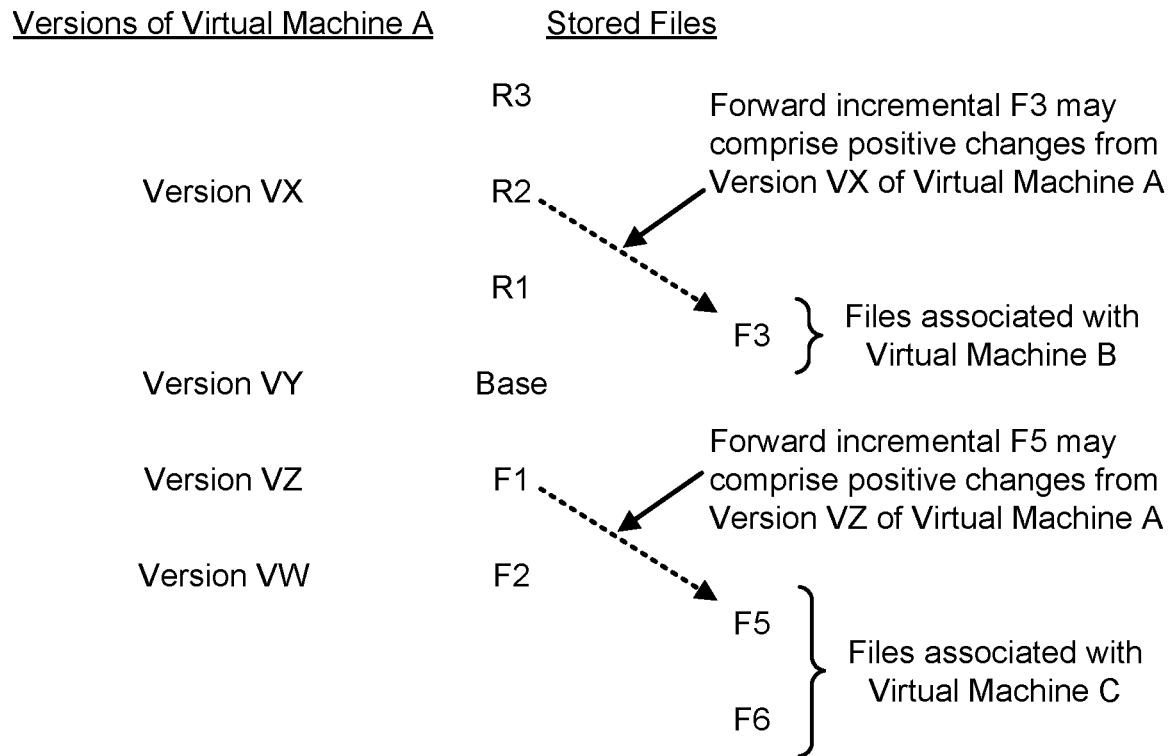
Figures 2J, 2K, 2L:
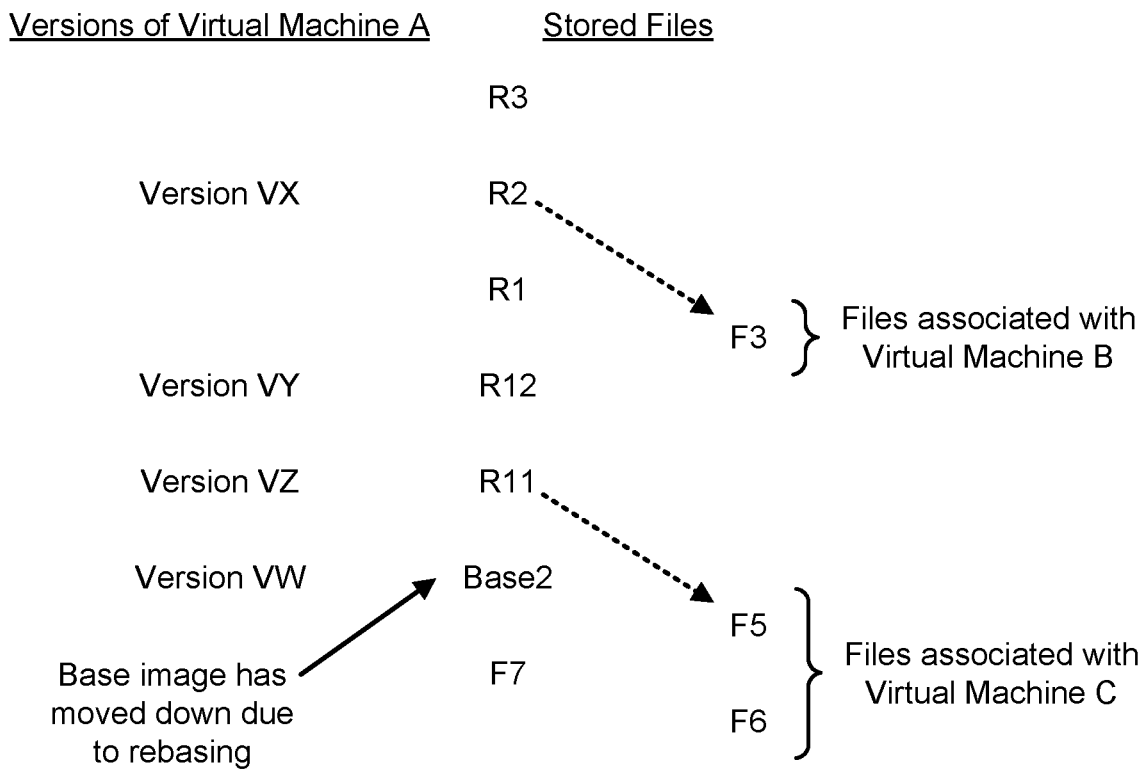
Figures 2M, 2N, 2O:
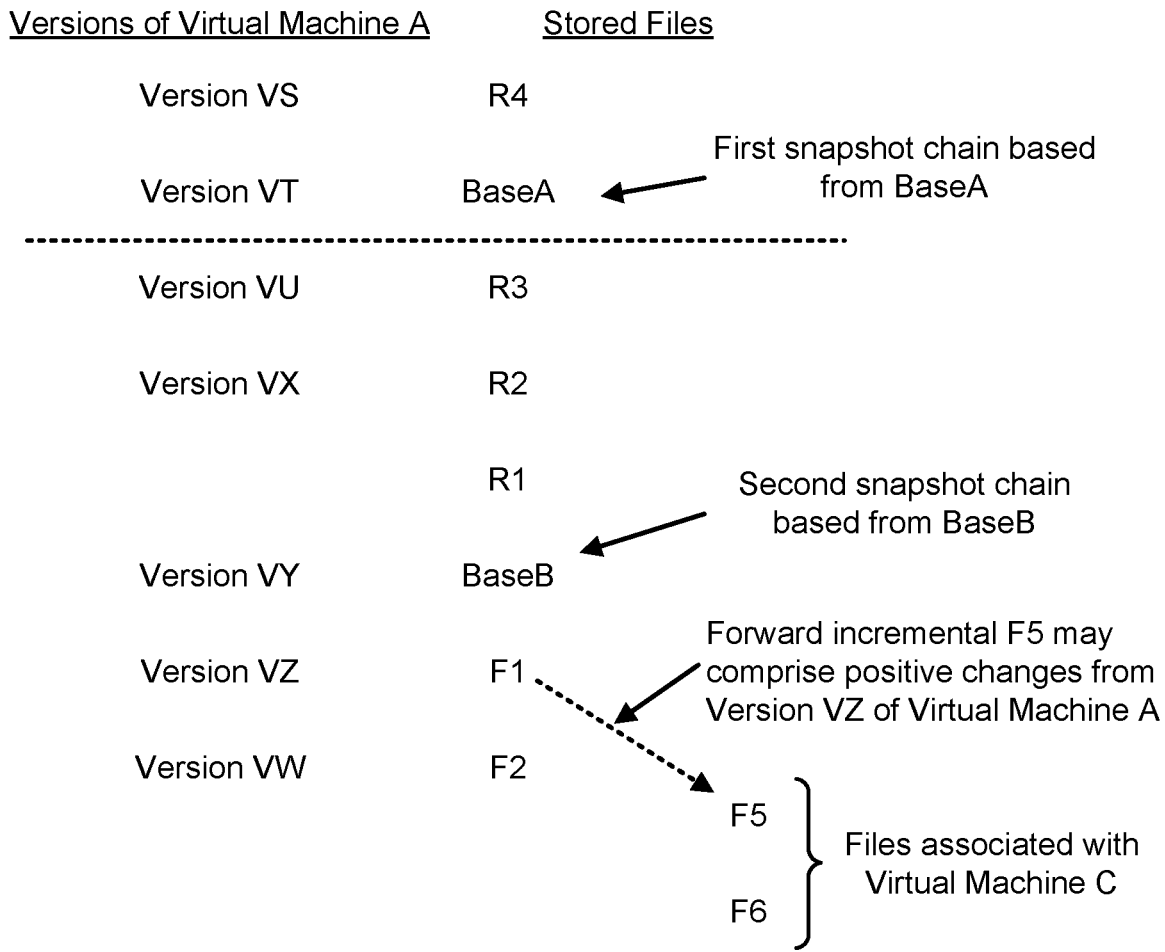
Figures 2P, 2Q:
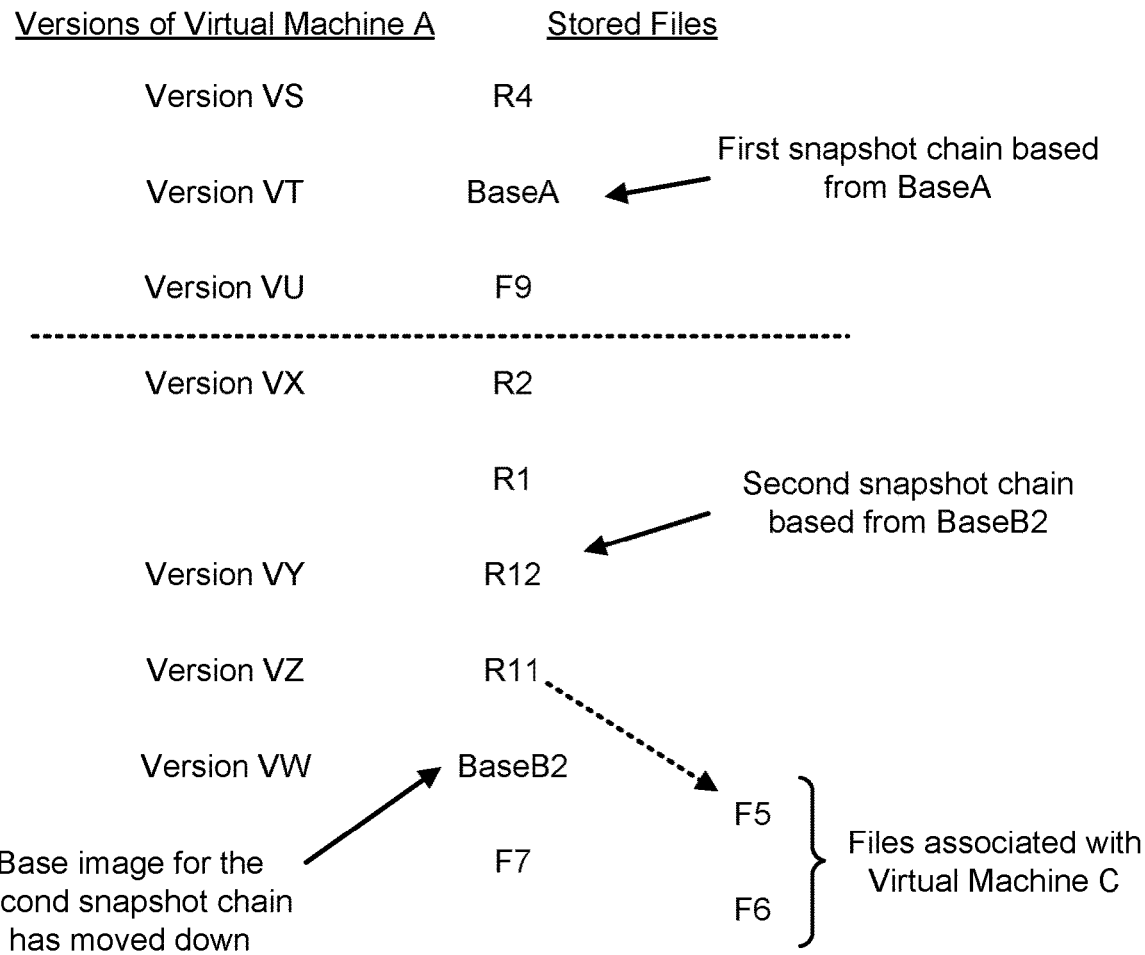

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6. The forward incremental F1 may include one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) or a reverse operation may be triggered when a number of forward incremental files is greater than a threshold number of forward incremental files for a snapshot chain (e.g., more than 200 forward incremental files). In other cases, a rebasing operation or a reverse operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
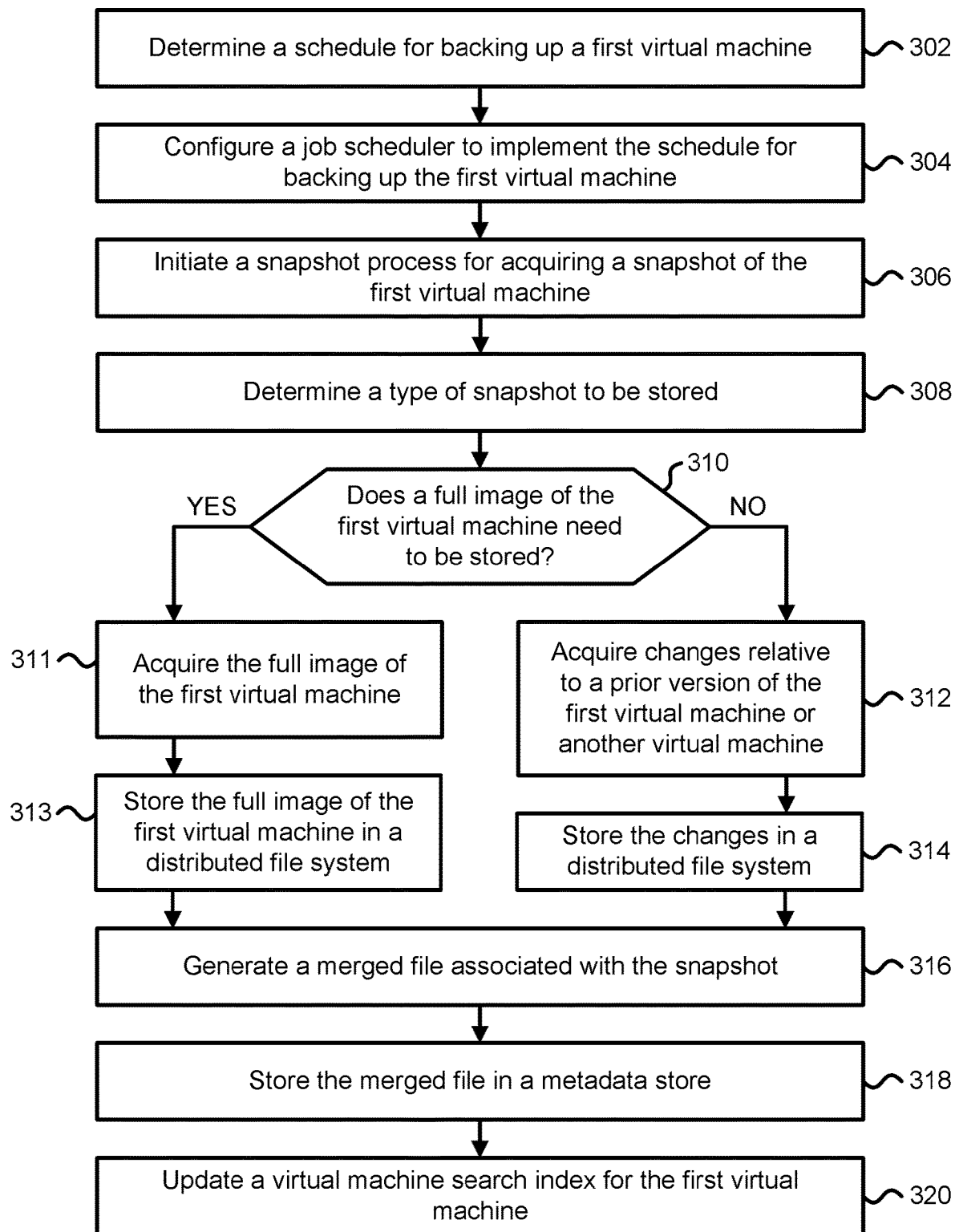
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
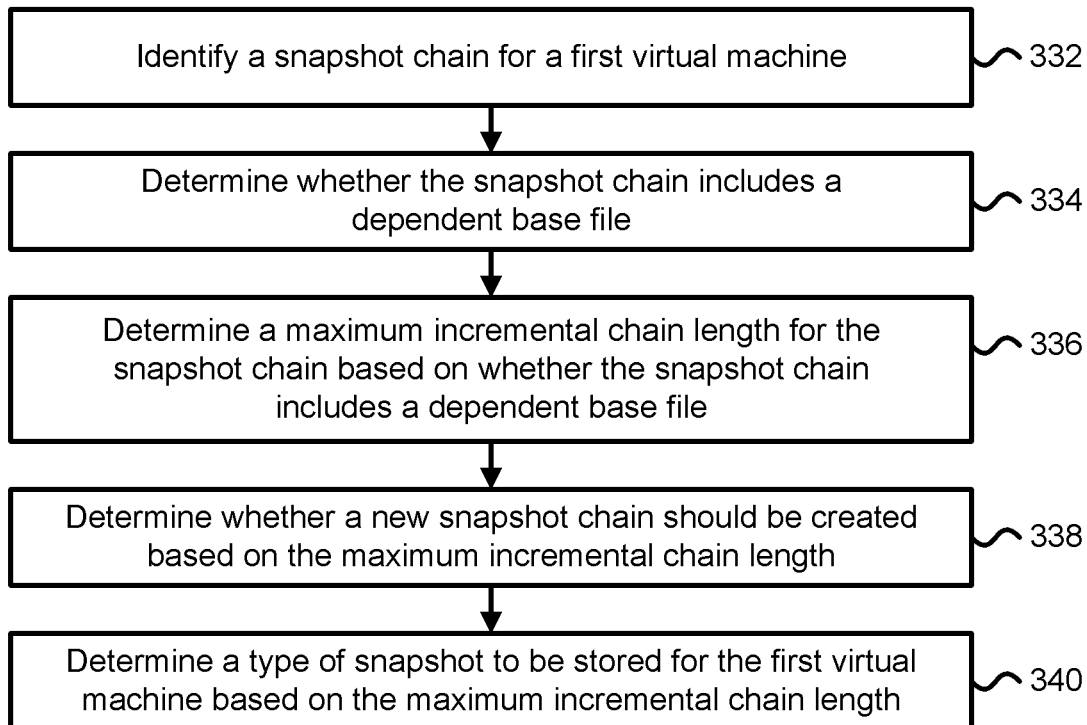
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
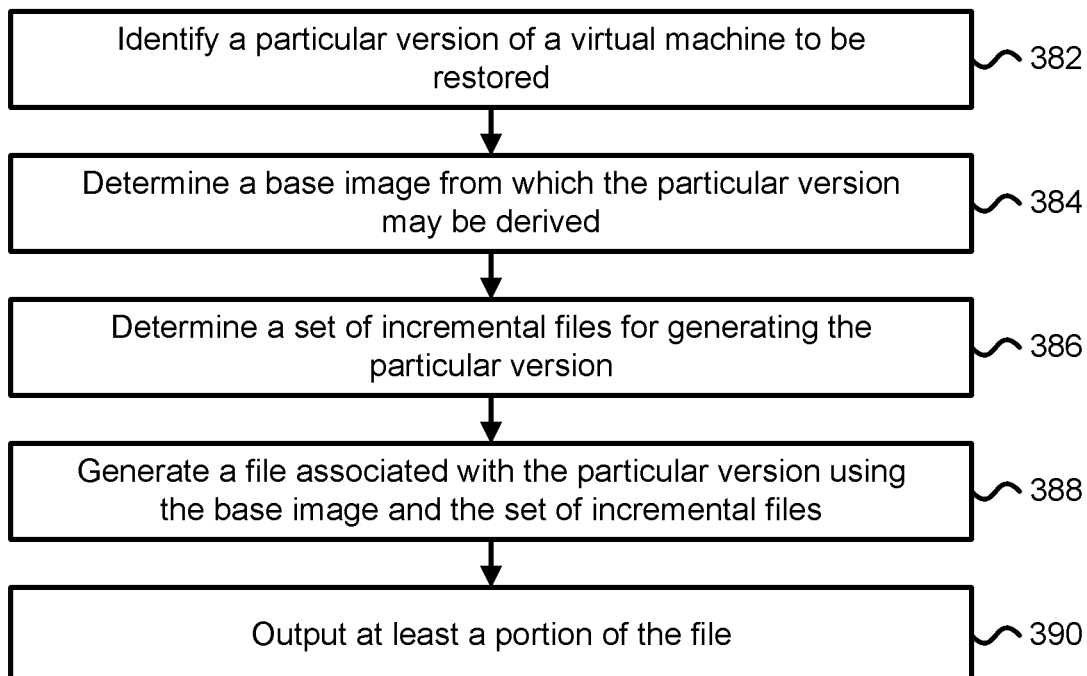
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

Figure 4A:
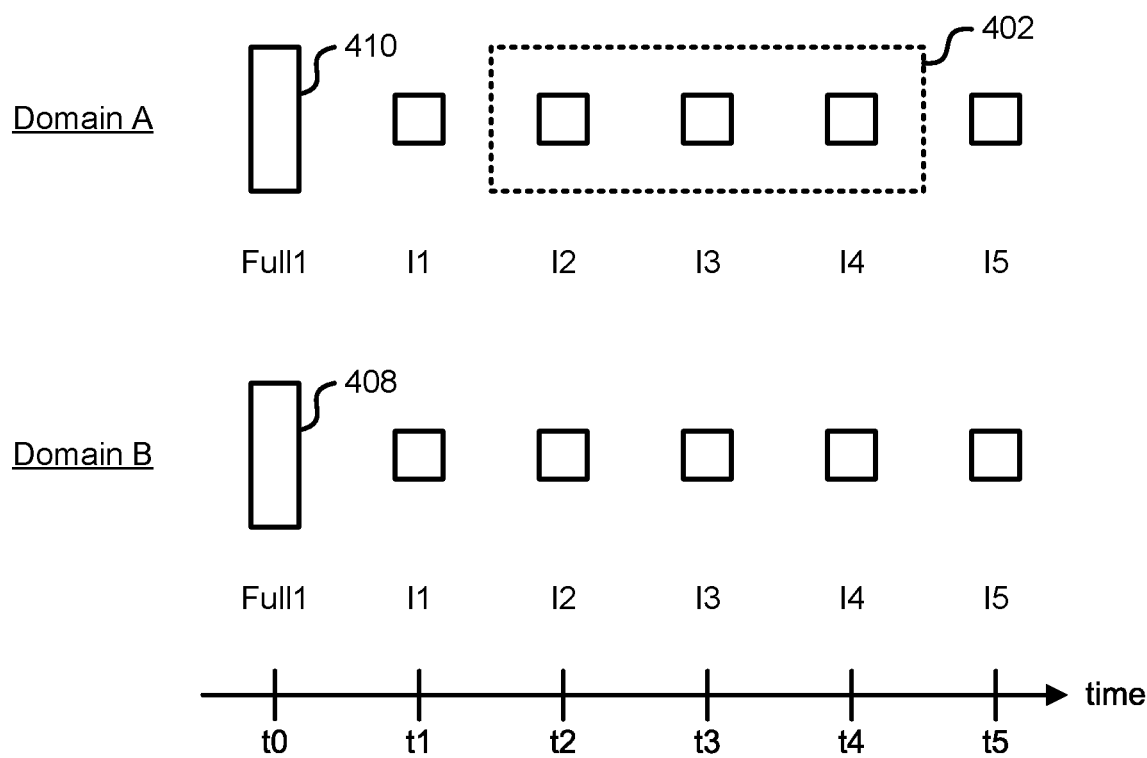
FIGS. 4A-4D depict various embodiments of electronic files stored within a first storage domain (Domain A) and a second storage domain (Domain B).

FIG. 4A depicts one embodiment of a first set of files stored in a first storage domain (Domain A) and a second set of files stored in a second storage domain (Domain B). The first set of files may correspond with different point in time versions of a virtual machine, different point in time versions of electronic file, or different point in time versions of a database. In one embodiment, the different point in time versions may comprise different point in time versions of a virtual machine captured at times t0-t5. In one example, versions V0-V5 of the virtual machine may correspond with times t0-t5 or have been captured at times t0-t5.

As depicted in FIG. 4A, the first set of files includes a first full image snapshot 410 (Full1) and a first set of incremental files (files I1-I5). The first set of incremental files may derive from the first full image snapshot. As an example, the first full image snapshot 410 may correspond with the full image (Base) in FIG. 2A and the first set of incremental files may correspond with the foreword incrementals F1-F2 in FIG. 2A. The second set of files includes a second full image snapshot 408 (Full1) and a second set of incremental files (files I1-I5). In one embodiment, the second set of files may be stored within a storage appliance, such as storage appliance 140 in FIG. 1A. In another embodiment, the second set of files may be stored using a storage appliance and the first set of files may be stored within a cloud repository or within a remote cluster of data storage nodes. In this case, the second storage domain may correspond with the storage appliance and the first storage domain may correspond with the remote cluster of data storage nodes. In another embodiment, the first storage domain may correspond with a first cluster of data storage nodes and the second storage domain may correspond with a second cluster of data storage nodes. In one example, the first cluster of data storage nodes may be associated with a first cloud-based data storage service and the second cluster of data storage nodes may be associated with a second cloud-based data storage service. In another example, the first cluster of data storage nodes may be located within a first data center and the second cluster of data storage nodes may be located within a second data center. In some cases, the first storage domain may correspond with a first cloud computing or data storage platform (e.g., Amazon Web Services®) and the second storage domain may correspond with a second cloud computing or data storage platform (e.g., Microsoft Azure®). The first storage domain and the second storage domain may comprise a multi-cloud environment. The first set of files and the second set of files may correspond with replicated data files or archived data files for different point in time versions of a virtual machine that are stored using two or more different data storage domains.

In one embodiment, a storage appliance, such as storage appliance 140 in FIG. 1A, may acquire a full image snapshot and a first set of incremental files corresponding with different point in time versions of a virtual machine. As the point in time versions of the virtual machine age, the full image snapshot and the first set of incremental files may be transferred to a second storage domain. In some cases, after the different point in time versions of the virtual machine have been captured and stored for more than a threshold amount of time (e.g., are older than a threshold number of days or have aged more than ten days from being captured), the full image snapshot and a set of incremental files that derive from the full image snapshot may be transferred to a second storage domain or moved to cloud-based data storage. In one example, an archival threshold parameter for determining when to move files to the second storage domain or to cloud-based data storage may be set based on requirements from an SLA policy (e.g., specifying that snapshots older than ten days be moved to archival data storage).

Figure 4B:
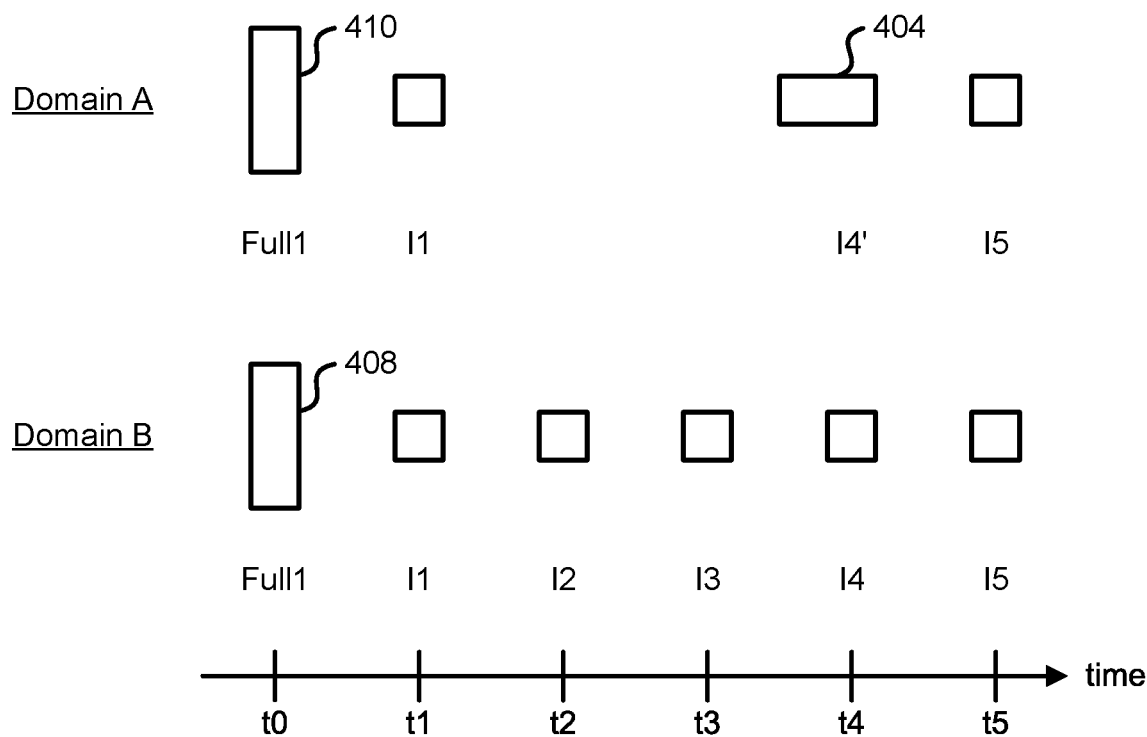

FIG. 4B depicts one embodiment of the two data storage domains depicted in FIG. 4A in which a consolidation operation has been performed in one storage domain (Domain A) of the two data storage domains. As depicted, a subset 402 of the first set of files comprising files I2-I4 stored using the first storage domain (Domain A) have been consolidated to form a new incremental file 404 (I4'). The new incremental file 404 may be generated by merging the subset 402 of the first set of files into a single consolidated incremental file comprising data changes made to the virtual machine between time t1 and time t4. In some cases, a consolidation operation may be performed in only one of the two data storage domains. Consolidation operations may be performed independently depending on the benefits (e.g., freeing up disk space) of performing the consolidation operation within each of the data storage domains.

In one embodiment, the determination of whether to consolidate or merge two or more incremental files into a new incremental file may depend upon an amount of available disk space for storing files within a particular storage domain, a combined disk size for the two or more incremental files, an amount of disk space savings if the consolidation of the two or more incremental files is performed, an amount of CPU usage or available bandwidth, and/or the availability of processing resources within the particular storage domain to perform the consolidation operation.

Figure 4C:
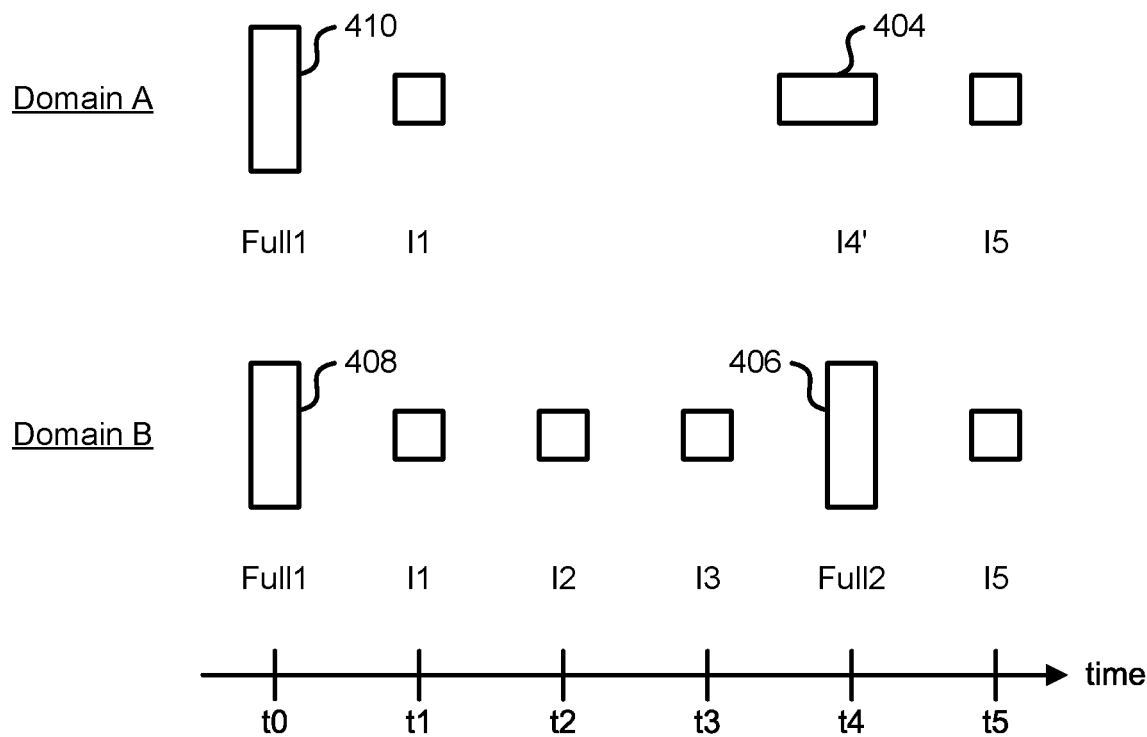

FIG. 4C depicts one embodiment of the two data storage domains depicted in FIG. 4B in which a third full image snapshot 406 (Full2) has been generated and stored to take the place of incremental file I4 in the second storage domain (Domain B). In one embodiment, the third full image snapshot 406 may be generated by combining the first full image snapshot 408 and the incremental files I1-I4 stored within the second storage domain. The third full image snapshot 406 may be generated by patching the incremental files I1-I4 to the first full image snapshot 408.

Figure 4D:
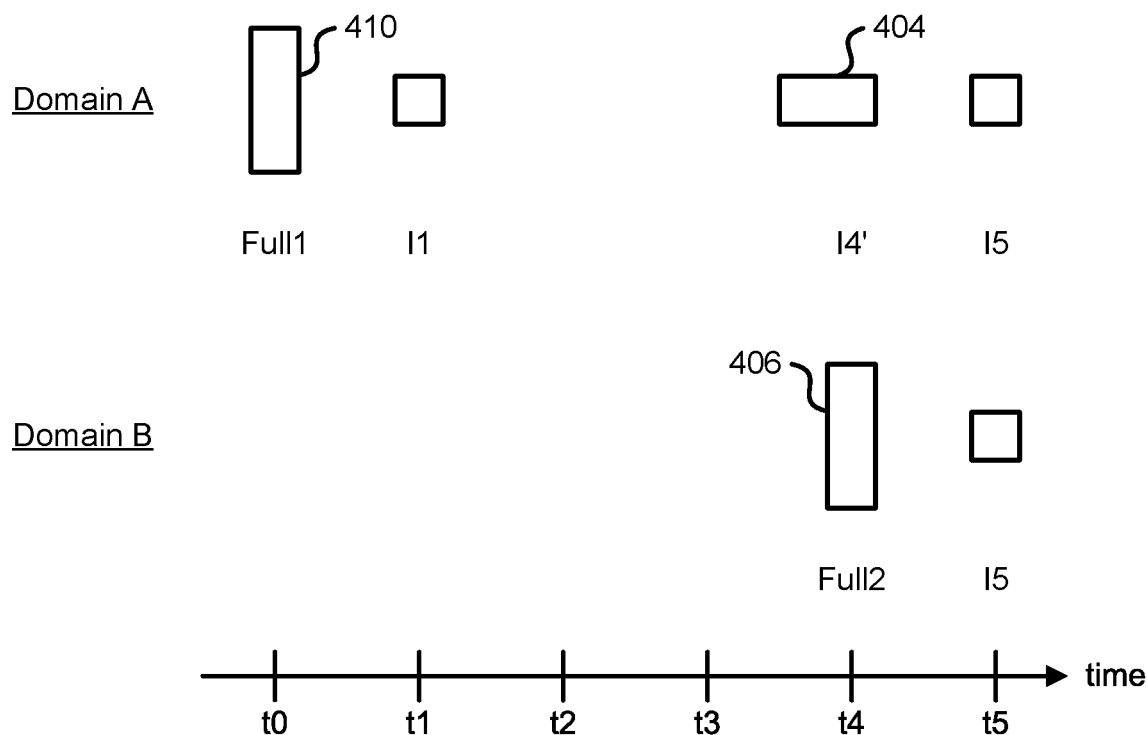

FIG. 4D depicts one embodiment of the two data storage domains depicted in FIG. 4C in which the incremental files I1-I4 stored within the second storage domain have been deleted and the first full image snapshot 408 has been deleted. One benefit of generating and storing the third full image snapshot 406 within the second storage domain is that incremental files corresponding with point in time versions occurring before the version V4 of the virtual machine corresponding with the third full image snapshot 406 may be deleted to free-up disk space or to increase the amount of available disk space within the second storage domain. In some cases, the consolidation and/or deletion of files stored within the first storage domain and the second storage domain may be performed independently such that the first storage domain may store a particular version of a virtual machine (e.g., corresponding with time t4 in FIG. 4D) using a first full image snapshot (e.g., full image snapshot 410 in FIG. 4D) and two forward incremental files (e.g., incremental files I1 and I4' in FIG. 4D), while the second storage domain may store the particular version of the virtual machine (e.g., version V4) using only a full image snapshot (e.g., full image snapshot 406 in FIG. 4D).

Figure 4E:
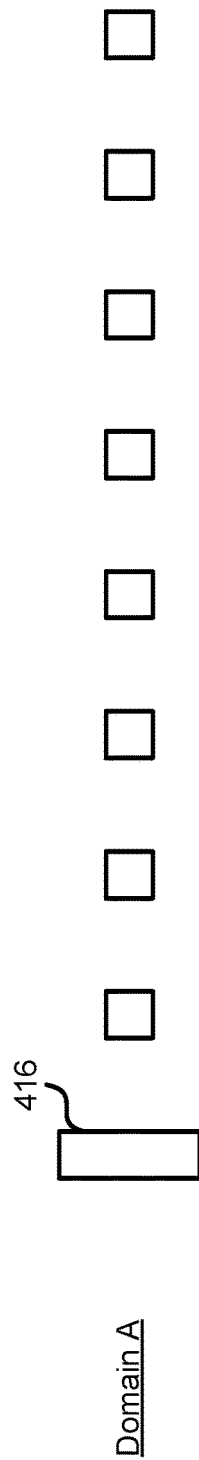
FIGS. 4E-4J depict various embodiments of electronic files stored within a first storage domain (Domain A).

FIG. 4E depicts one embodiment of a set of files stored within a first storage domain (Domain A). In one embodiment, the first storage domain may correspond with a storage appliance, such as storage appliance 170 in FIG. 1A. In another embodiment, the first storage domain may correspond with cloud-based data storage. The set of files includes a first full image snapshot 416 (Full1) and a set of forward incremental files (I1-I8) that derive from the first full image snapshot 416. In some cases, a storage appliance may acquire and store snapshots of a virtual machine over time. As the snapshots age, electronic files corresponding with the aged snapshots may be moved from the storage appliance to the first storage domain. An archival threshold parameter may be set to a particular number of days (e.g., seven days) such that snapshots of the virtual machine that are older than the particular number of days are moved or archived to the first storage domain. For example, the storage appliance may store 16 snapshots of the virtual machine locally and then transfer nine snapshots of the virtual machine that are older than seven days to the first storage domain. The nine snapshots of the virtual machine that are older than seven days may correspond with the set of files depicted in FIG. 4E.

In some cases, an SLA policy may require that the three most recent snapshots (e.g., corresponding with incremental files I6-I8) transferred to the first storage domain remain as individually accessible snapshots. The SLA policy may also provide that snapshots of the virtual machine older than the three most recent snapshots stored within the first storage domain must be retained at a particular frequency. In one example, the set of files stored within the first storage domain may correspond with daily snapshots of the virtual machine. The SLA policy may require that daily snapshots of the virtual machine be preserved for ten days and thereafter one snapshot must be preserved every three days. In another example, the set of files stored within the first storage domain may correspond with snapshots of a virtual machine taken every eight hours for three days and then retaining one a day for one week.

Figure 4F:
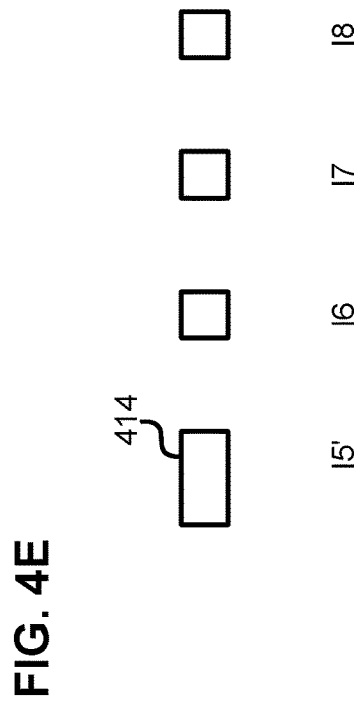

FIG. 4F depicts one embodiment of the first storage domain of FIG. 4E in which two consolidation operations have been performed to generate incremental file 412 (I2') and incremental file 414 (I5'). The incremental file 412 may be generated by merging the incremental files I1-I2 in FIG. 4E. The incremental file 414 may be generated by merging the incremental files I3-I5 in FIG. 4E. After the incremental files 412 and 414 have been generated to preserve the point in time snapshots corresponding with the incremental files I2 and I5 in FIG. 4E, the original incremental files I1-I5 in FIG. 4E may be deleted from the first storage domain to free-up disk space. In some cases, the incremental file 412 may correspond with a version of a virtual machine that has been pinned or prevented from being deleted (e.g., due to an application requiring that version of the virtual machine).

Figure 4G:
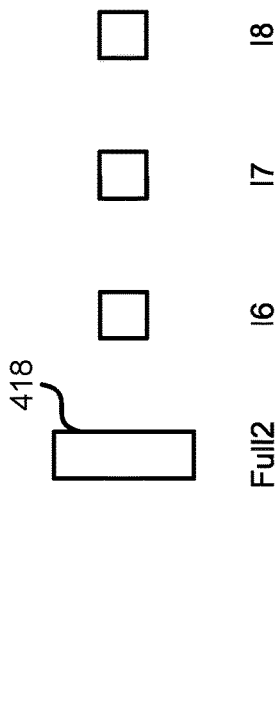

FIG. 4G depicts another embodiment of the first storage domain of FIG. 4E in which a consolidated incremental file 412 (I2') and a second full image snapshot 418 (Full2) have been generated and stored. The incremental file 412 may be generated by merging the incremental files I1-I2 in FIG. 4E. The second full image snapshot 418 may be generated by merging the first full image snapshot 416 and the incremental files I1-I5 in FIG. 4E. After patching the incremental files I1-I5 to the first full image snapshot 416 and storing the second full image snapshot 418 within the first storage domain, the original incremental files I1-I5 in FIG. 4E may be deleted from the first storage domain to free-up disk space. One benefit of generating the second full image snapshot 418 is that the first full image snapshot 416 and the incremental file 412 may be deleted after expiration without affecting the downstream incremental files, such as incremental files I6-I8.

In one embodiment, computing resources within the first storage domain or accessible by the first storage domain (e.g., the first storage domain may comprise a cloud-based data storage repository with access to an elastic compute cloud or to a cloud-based computing platform) may be used to generate the second full image snapshot 418 after acquiring the first full image snapshot 416 and the original incremental files I1-I5 in FIG. 4E. In another embodiment, a storage appliance that captures or stores snapshots of the virtual machine may locally generate the second full image snapshot 418 and transfer the second full image snapshot 418 to the first storage domain rather than transferring the incremental file corresponding with incremental file I5 in FIG. 4E. In one example, a storage appliance, such as storage appliance 170 in FIG. 1A, may generate and transfer full image snapshots of the virtual machine to the first storage domain on a periodic basis (e.g., once a day or every 100 snapshots). In another example, a storage appliance may detect that a combined data size of a set of incremental files that have been transferred to the first storage domain has exceeded a threshold data size (e.g., the combined file sizes for the set of incremental files may exceed 1 TB of data) and in response may generate and transfer a full image snapshot of the virtual machine to the first storage domain. In this case, the maximum data size between any two full image snapshots of the virtual machine within the first storage domain may be set or regulated by the storage appliance. After the full image snapshot of the virtual machine has been transferred to the first storage domain, consolidation and deletion operations may be performed in order to free-up disk space as the snapshots age within the first storage domain.

Figure 4H:
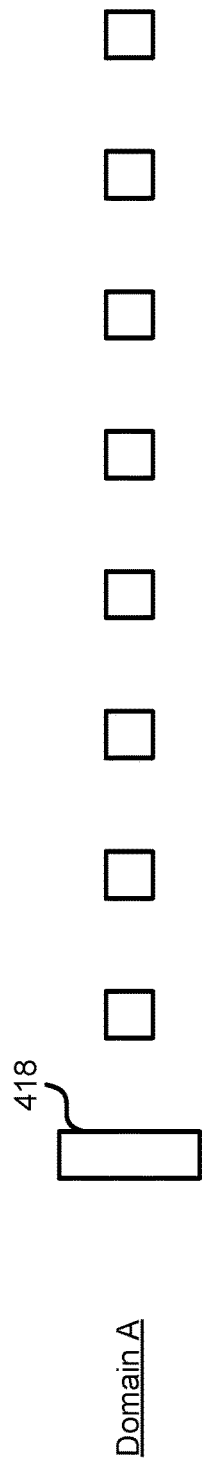

FIG. 4H depicts one embodiment of the first storage domain of FIG. 4G in which the archived snapshots older than the point in time corresponding with the second full image snapshot 418 have been deleted. Thus, the second full image snapshot 418 comprises the oldest available snapshot within the first storage domain. Incremental files I9-I13 have been archived to the first storage domain.

Figure 4I:
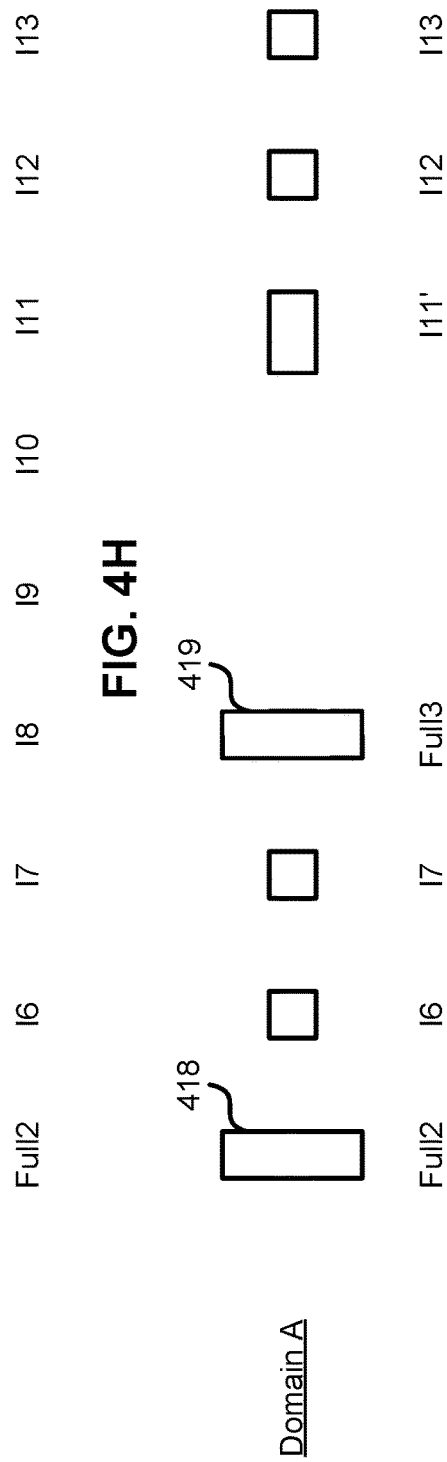

FIG. 4I depicts one embodiment of the first storage domain of FIG. 4H in which a third full image snapshot 419 (Full3) has been generated and replaced the incremental file I8 in the first storage domain. The incremental files I8-I10 have been deleted from the first storage domain. A consolidated incremental file I11' has been generated by merging incremental files I9-I11. The third full image snapshot 419 may have been generated in response to detecting that the total number of expired snapshots within the first storage domain that are older than the point in time corresponding with the third full image snapshot 419 is greater than a threshold number of snapshots, that the amount of available disk space for storing files within the first storage domain is below a threshold amount of disk space, and/or that the combined data size of the expired snapshots within the first storage domain is greater than a threshold data size (e.g., more than 1 TB of disk space may be reclaimed by generating the third full image snapshot and deleting expired snapshots older than the third full image snapshot).

Figure 4J:
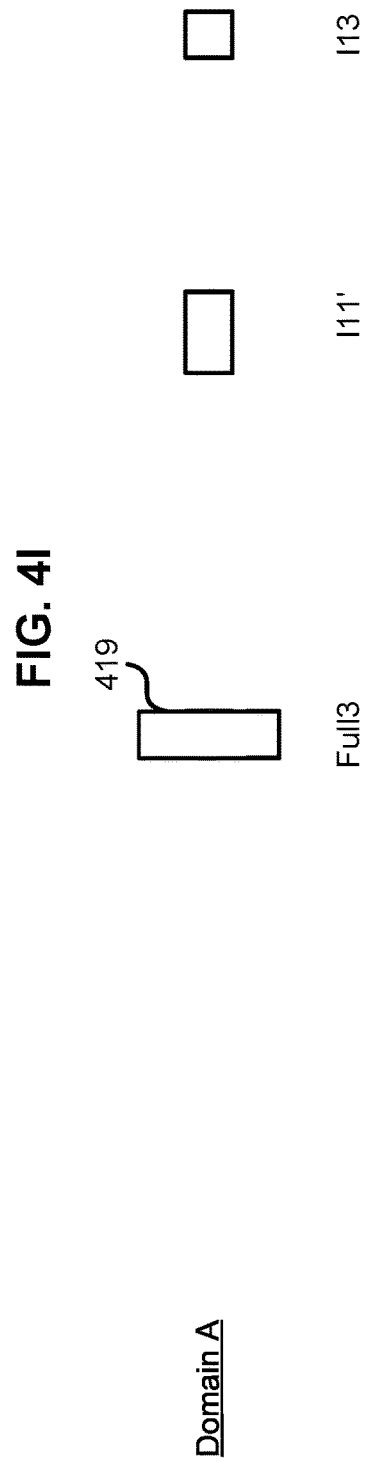

FIG. 4J depicts one embodiment of the first storage domain of FIG. 4I in which incremental files I6-I7 and I12 have been deleted and the second full image snapshot 418 has been deleted in order to reclaim disk space within the first storage domain.

In one embodiment, a hybrid local/remote data management system may include a replication system that replicates data between a local storage appliance and a remote storage appliance and/or a cloud-based storage service. The data may be deduplicated and compressed prior to being transferred from the local storage appliance to the remote storage appliance or the cloud-based storage service. In some embodiments, the local storage appliance may transfer or write full image snapshots and incremental files deriving from the full image snapshots to two or more remote storage appliance and/or two or more cloud-based storage services.

Figure 5A:
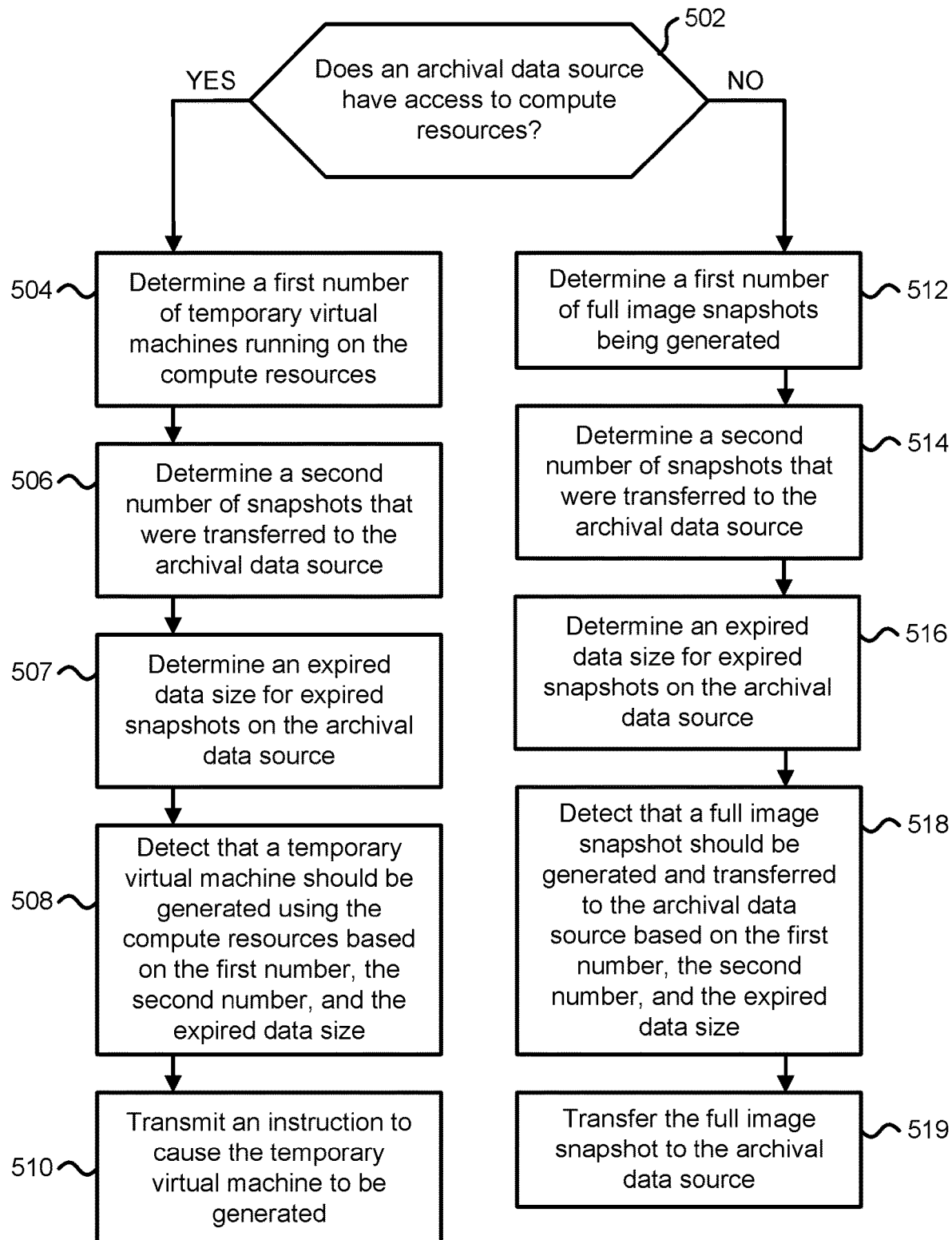
FIG. 5A is a flowchart describing one embodiment of a process for reclaiming disk space within an archival data source.

FIG. 5A is a flowchart describing one embodiment of a process for reclaiming disk space within an archival data source (or an archival data store). In one embodiment, the process of FIG. 5A may be performed by a storage appliance, such as storage appliance 170 or storage appliance 140 in FIG. 1A. The process of FIG. 5A may also be performed using cloud-based computing resources or by generating and running virtual machines within a virtualized infrastructure.

In step 502, it is determined whether an archival data source has access to compute resources. The archival data source may comprise a hardware data storage device, a storage area network storage device, a networked-attached storage device, or a cloud-based data storage system. The archival data source may comprise a cloud-based data storage infrastructure with the ability to instantiate virtual machines that have the ability to modify data stored within the cloud-based data storage infrastructure. If it is determined that the archival data source has access to compute resources, then step 504 is performed. Otherwise, if it is determined that the archival data source does not have access to the compute resources, then step 512 is performed. In step 504, a first number of temporary virtual machines running on the compute resources is determined. The first number of temporary virtual machines may correspond with the number of virtual machines running within a virtualized infrastructure for performing consolidation and/or deletion of expired snapshots. In step 506, a second number of snapshots that have been transferred to the archival data source is determined. In one example, the second number of snapshots may correspond with the number of snapshots that were transferred to the archival data source since a last full image snapshot was uploaded. In step 507, an expired data size for expired snapshots on the archival data source is determined. In some cases, the expired data size may correspond with the maximum amount of disk space that may be reclaimed on the archival data source.

In step 508, it is detected that a temporary virtual machine should be generated using the compute resources based on the first number of temporary virtual machines running on the compute resources, the second number of snapshots that were previously transferred to the archival data source, and/or the expired data size for the expired snapshots on the archival data source. In one example, the temporary virtual machine may be generated in response to detecting that the second number of snapshots that were previously transferred to the archival data source has exceeded a threshold number of snapshots (e.g., 100 snapshots were previously transferred). In another example, the temporary virtual machine may be generated in response to detecting that the expired data size for the expired snapshots on the archival data source has exceeded a threshold data size (e.g., is more than 500 GB). In step 510, an instruction to cause the temporary virtual machine to be generated is transmitted. The instruction may be transmitted to a cloud-based data storage infrastructure in order to generate the temporary virtual machine within the cloud-based data storage infrastructure. In one example, the temporary virtual machine may comprise an instance of a virtual server for running applications within a virtualized infrastructure. The cloud-based data storage infrastructure may provide resizable compute capacity in the cloud. In some cases, the temporary virtual machine may correspond with a cloud computing instance (e.g., an EC2 instance) with access to cloud-based data storage (e.g., the S3 cloud-based data storage service).

In step 512, a first number of full image snapshots being generated is determined. The first number of full image snapshots may correspond with the number of full image snapshots being concurrently generated by a storage appliance, such as storage appliance 170 in FIG. 1A. In some cases, the number of full image snapshots being generated by a storage appliance or the number of full image snapshots that are being transferred to the archival data source may be restricted or limited (e.g., no more than four full image snapshots may be generated and/or transferred from the storage appliance at the same time). In some cases, a distributed semaphore may be used to throttle or limit the number of full image snapshots that are generated and transferred to the archival data source. Before a new full image snapshot is generated, the job for generating the new full image snapshot may need to access the semaphore. If the job fails to allocate from the semaphore, then the job may proceed and upload an incremental snapshot instead of the new full image snapshot.

In step 514, a second number of snapshots that were previously transferred to the archival data source is determined. In one example, the second number of snapshots may comprise the total number of snapshots that were previously transferred to the archival data source after the last full image snapshots was transferred to the archival data source (e.g., transferred to a cloud-based data storage repository). In step 516, an expired data size for expired snapshots on the archival data source is determined. In step 518, it is detected that a full image snapshot should be generated and transferred to the archival data source based on the first number, the second number, and the expired data size. In step 519, the full image snapshot is transferred to the archival data source. In one embodiment, the full image snapshot may be generated and transferred in response to detecting that the second number of snapshots that were previously transferred to the archival data source has exceeded a threshold number of snapshots (e.g., 200 snapshots were previously transferred). In another embodiment, the full image snapshot may be generated and transferred in response to detecting that the expired data size for the expired snapshots on the archival data source has exceeded a threshold data size (e.g., the expired data size is greater than 1 TB).

Figure 5B:
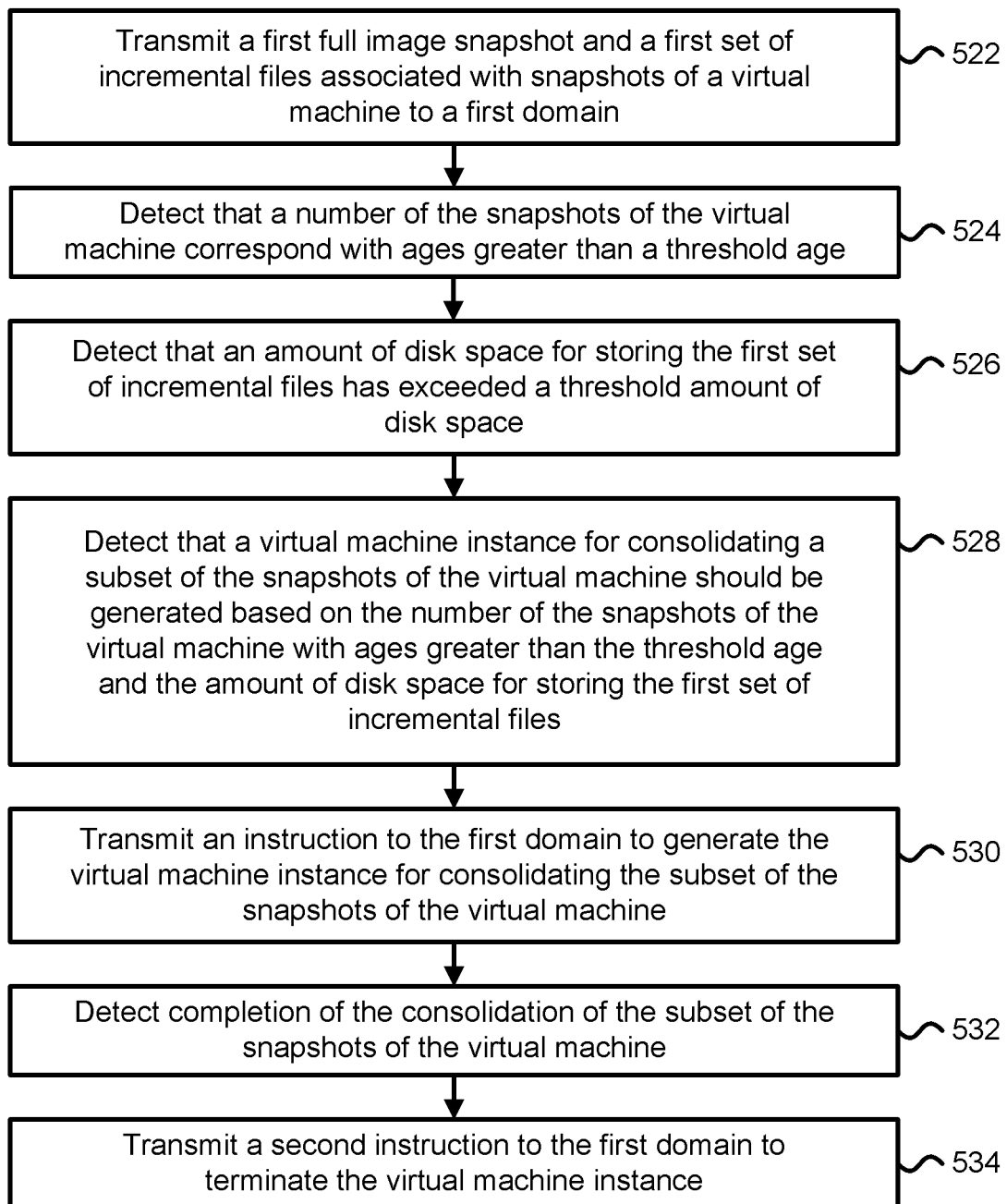
FIG. 5B is a flowchart describing one embodiment of a process for generating one or more virtual machines for consolidating expired snapshots.

FIG. 5B is a flowchart describing one embodiment of a process for generating one or more virtual machines for consolidating and/or deleting expired snapshots. In one embodiment, the process of FIG. 5B may be performed by a storage appliance, such as storage appliance 170 or storage appliance 140 in FIG. 1A. The process of FIG. 5B may also be performed using cloud-based computing resources or by generating and running virtual machines within a virtualized infrastructure.

The process of FIG. 5B may be performed by a local storage appliance that is used for capturing and storing snapshots of a virtual machine. The local storage appliance may control the generation of a temporary virtual machine within a cloud computing environment in order to generate full image snapshots within the cloud computing environment, consolidate incremental files within the cloud computing environment, and delete expired snapshots within the cloud computing environment.

In step 522, a first full image snapshot and a first set of incremental files associated with snapshots of a virtual machine are transmitted to a first domain. The first domain may comprise a cloud-based data storage domain. In step 524, it is detected that a number of the snapshots of the virtual machine correspond with ages greater than a threshold age (e.g., more than 100 snapshots were captured more than three months ago). In step 526, it is detected that an amount of disk space for storing the first set of incremental files has exceeded a threshold amount of disk space. In step 528, it is detected that a virtual machine instance for consolidating a subset of the snapshots of the virtual machine should be generated based on the number of the snapshots of the virtual machine with ages greater than the threshold age and/or the amount of disk space for storing the first set of incremental files. In step 530, an instruction is transmitted to the first domain to generate the virtual machine instance for consolidating the subset of the snapshots of the virtual machine. In one example, a cloud-based service may provide the ability to run virtual machine instances such that a virtual machine may be created or spun up to perform consolidation and/or deletion operations on archived data and then removed. In some cases, a previously uploaded image that contains the latest binaries for performing the consolidation and/or deletion operations and various credentials for accessing the archived data may be used to launch the virtual machine instance. In step 532, a completion of the consolidation of the subset of the snapshots of the virtual machine is detected. In step 534, a second instruction is transmitted to the first domain to terminate the virtual machine instance.

Figure 5C:
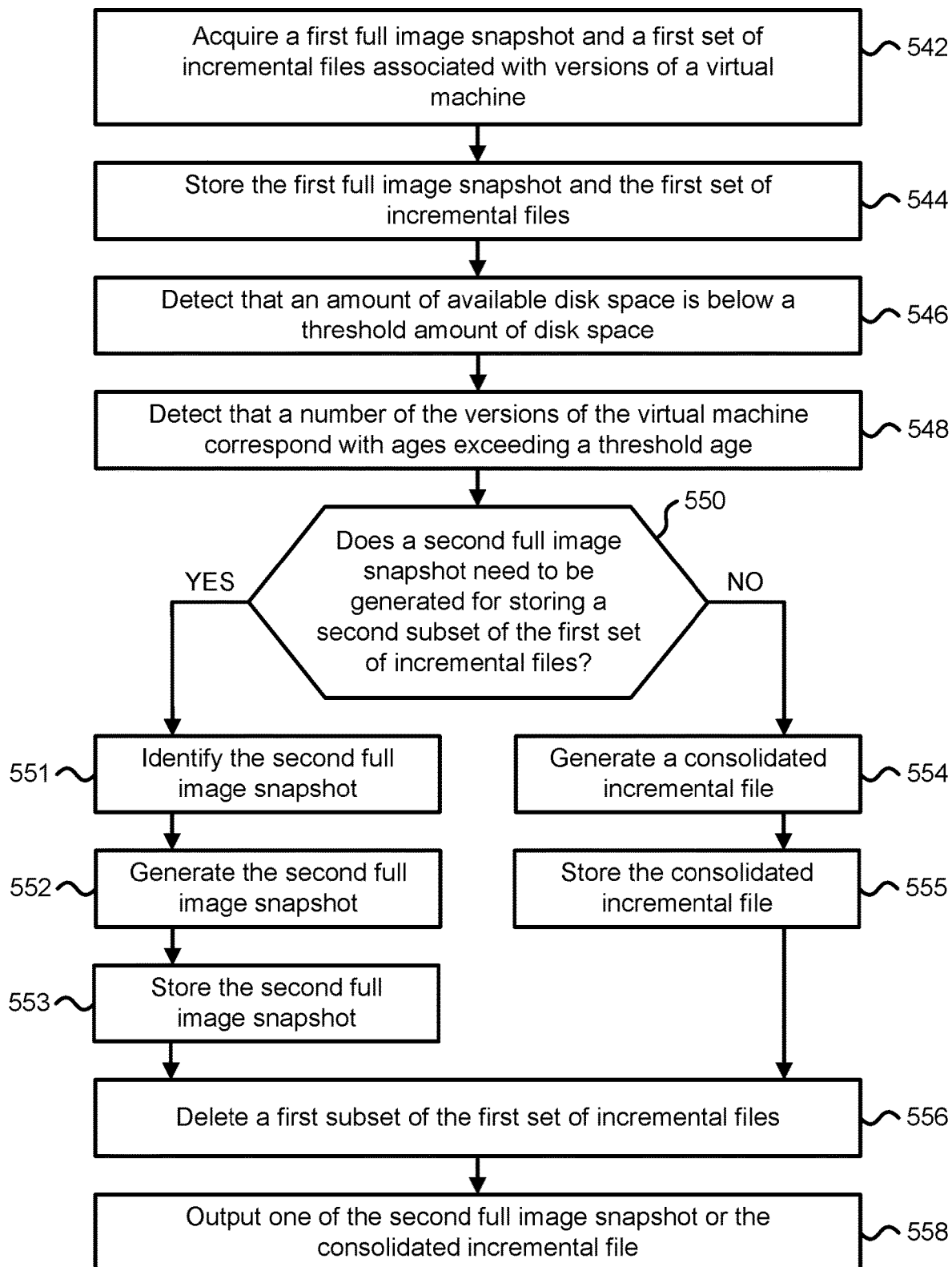
FIG. 5C is a flowchart describing one embodiment of a process for consolidating expired snapshots.

FIG. 5C is a flowchart describing one embodiment of a process for consolidating expired snapshots. In one embodiment, the process of FIG. 5C may be performed by a storage appliance, such as storage appliance 170 or storage appliance 140 in FIG. 1A. The process of FIG. 5C may be performed using cloud-based computing resources or by generating and running virtual machines within a virtualized infrastructure.

In step 542, a first full image snapshot and a first set of incremental files associated with versions of the virtual machine are acquired. The first full image snapshot may correspond with full image snapshot 416 stored using the first storage domain in FIG. 4E and the first set of incremental files may correspond with incremental files I1-I8 stored using the first storage domain in FIG. 4E. In step 544, the first full image snapshot and the first set of incremental files are stored. In step 546, it is detected that an amount of available disk space is below a threshold amount of disk space. In one example, it may be detected that the amount of available disk space within a first storage domain is less than 10 TB. In step 548, it is detected that a number of the versions of the virtual machine correspond with ages exceeding a threshold age. In one example, it may be detected that at least 20 snapshots of the virtual machine correspond with versions that are more than one month old.

In step 550, it is determined whether a second full image snapshot needs to be generated for storing a second subset of the first set of incremental files. In some cases, the second full image snapshot may allow a dependency chain to be broken and allow the second subset of the first set of incremental files to be stored while a first subset of the first set of incremental files is deleted or no longer accessible. In one example, the first set of incremental files may correspond with incremental files I1-I8 stored using the first storage domain in FIG. 4E, the first subset of the first set of incremental files may correspond with incremental files I1-I4, and the second subset of the first set of incremental files may correspond with incremental files I5-I8. The determination of whether the second full image snapshot needs to be generated may depend on an amount of available disk space for storing the second subset of the first set of incremental files and/or the first subset of the first set of incremental files (e.g., the amount of available disk space within a data storage device comprising a first storage domain), a virtual machine change rate for the virtual machine, detection of an increase in the amount of data changes occurring to the virtual machine, the total number of snapshots captured for the virtual machine, and/or a combined data size for the first set of incremental files. If it is determined that the second full image snapshot needs to be generated, then step 551 is performed. Otherwise, if it is determined that the second full image snapshot does not need to be generated, then step 554 is performed.

In step 551, the second full image snapshot is identified. In one embodiment, the second full image snapshot may be identified as the oldest snapshot that has not yet expired or the oldest snapshot of a virtual machine that cannot be deleted and must be recoverable. In another embodiment, the second full image snapshot may be identified as the next snapshot of a virtual machine to be archived or transferred from a first data storage domain to a second data storage domain. In step 552, the second full image snapshot is generated. In one example, the second full image snapshot may correspond with full image snapshot 418 in FIG. 4G. The second full image snapshot may be generated by applying incremental files to the first full image snapshot. In one example, the second full image snapshot 418 in FIG. 4G may be generated by applying or patching incremental files I1-I5 in FIG. 4E to the first full image snapshot 416 in FIG. 4E.

In step 553, the second full image snapshot is stored. The second full image snapshot may be stored using a volatile memory or a non-volatile memory. The second full image snapshot may be stored using a HDD or an SSD. In step 554, a consolidated incremental file is generated. In step 555, the consolidated incremental file is stored. In one example, the consolidated incremental file may correspond with incremental file 414 in FIG. 4F and the consolidated incremental file may be generated by merging incremental files I3-I5 in FIG. 4E. In step 556, a first subset of the first set of incremental files is deleted. In one example, the first set of incremental files may correspond with incremental files I1-I8 in FIG. 4E. The first subset of the first set of incremental files may comprise incremental files I3-I4 in FIG. 4E and the second subset of the first set of incremental files may comprise incremental files I6-I8 in FIG. 4E. In step 558, the second full image snapshot or the consolidated incremental file may be outputted. The second full image snapshot may be outputted by transferring the second full image snapshot or a portion of the second full image snapshot to a hardware data storage device, a computing device, or to cloud-based data storage.

In one embodiment, the second full image snapshot may be generated by a storage appliance, such as storage appliance 170 in FIG. 1A, and transmitted from the storage appliance to a remote storage appliance or to cloud-based data storage. In another embodiment, the consolidated incremental file may be generated by the storage appliance and transmitted from the storage appliance to the remote storage appliance or to cloud-based data storage.

Figure 5D:
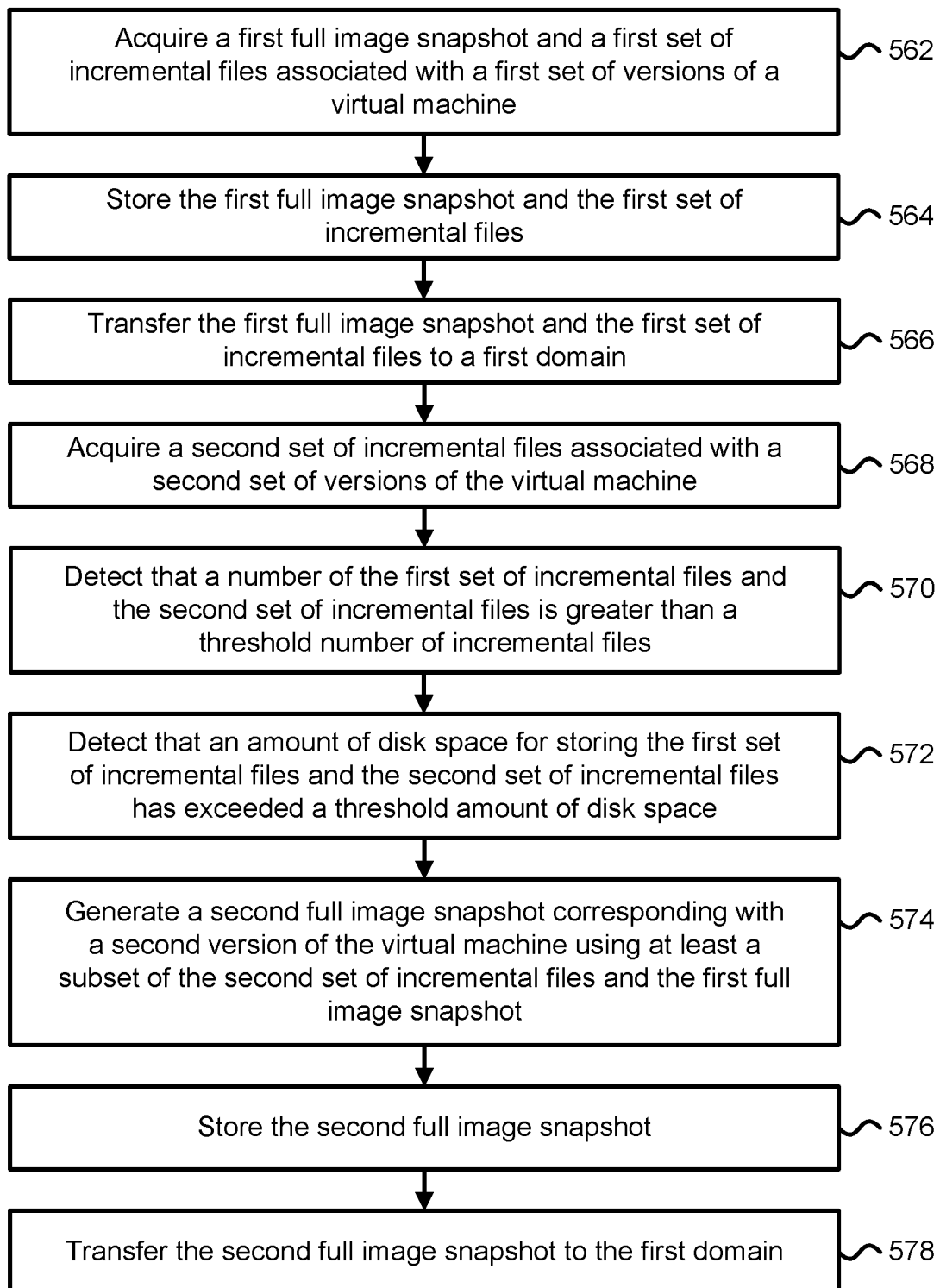
FIG. 5D is a flowchart describing one embodiment of a process for generating one or more full image snapshots to enable deletion of expired snapshots.

FIG. 5D is a flowchart describing one embodiment of a process for generating one or more full image snapshots to enable deletion of expired snapshots. In one embodiment, the process of FIG. 5D may be performed by a storage appliance, such as storage appliance 170 or storage appliance 140 in FIG. 1A. The process of FIG. 5D may also be performed using cloud-based computing resources or by generating and running virtual machines within a virtualized infrastructure.

The process of FIG. 5D may be performed by a local storage appliance that is used for capturing and storing snapshots of a virtual machine. The local storage appliance may control the generation and uploading of periodic full image snapshots in order to facilitate the deletion of expired snapshots within an archival data source.

In step 562, a first full image snapshot and a first set of incremental files associated with a first set of versions of a virtual machine are acquired. In step 564, the first full image snapshot and the first set of incremental files are stored. In one example, the first full image snapshot may correspond with the first full image snapshot 416 in FIG. 4E and the first set of incremental files may correspond with incremental files I1-I4 in FIG. 4E. In step 566, the first full image snapshot and the first set of incremental files are transferred to a first domain. In one example, the first domain may correspond with the first storage domain (Domain A) in FIG. 4E. In step 568, a second set of incremental files associated with a second set of versions of the virtual machine are acquired. The second set of versions of the virtual machine may comprise point in time versions of the virtual machine that are captured subsequent to the first set of versions of the virtual machine. In one embodiment, a storage appliance, such as storage appliance 170 in FIG. 1A, may acquire the first set of incremental files and the second set of incremental files from a server, such as server 160 FIG. 1A. The first set of incremental files may correspond with incremental files I1-I4 in FIG. 4E and the second set of incremental files may correspond with incremental files I5-I8 in FIG. 4E.

In step 570, it is detected that a number of the first set of incremental files and/or the second set of incremental files is greater than a threshold number of incremental files. In one example, it may be detected that the combined number of the first set of incremental files and the second set of incremental files acquired from a server is greater than the threshold number of incremental files (e.g., is greater than 100 incremental files). In step 572, it is detected that an amount of disk space for storing the first set of incremental files and/or the second set of incremental files has exceeded a threshold amount of disk space. In one example, it may be detected that the amount of disk space for storing the first of incremental files and the second set of incremental files using a storage appliance has exceeded the threshold amount of disk space (e.g., is greater than 1 TB of disk space).

In step 574, a second full image snapshot corresponding with a second version of the virtual machine is generated using at least a subset of the second set of incremental files and the first full image snapshot. The second full image snapshot may correspond with the second full image snapshot 418 in FIG. 4G, the subset of the second set of incremental files may correspond with the incremental file I5 in FIG. 4E, and the first full image snapshot may correspond with the first full image snapshot 416 in FIG. 4E. In step 576, the second full image snapshot is stored. In some cases, a storage appliance may store or retain the second full image snapshot even after the second full image snapshot has been transferred to a first storage domain for archiving (e.g., to a first cloud-based data storage service). In step 578, the second full image snapshot is transferred to the first domain. The second full image snapshot may be outputted or electronically transmitted to a server within the first domain. In one example, the first domain may comprise a portion of a data center and the second full image snapshot may be transmitted to a server within the data center used for managing, archiving, or storing snapshots of virtual machines. In some cases, a full upload threshold parameter for determining when to generate and upload a full image snapshot to a data archival source may be set based on a snapshot frequency for capturing snapshots of a real or virtual machine or based on requirements from an SLA policy assigned to the real or virtual machine.

In one embodiment, the second full image snapshot may be generated and uploaded to a data archival source in response to detecting that the number of the first set of incremental files and the second set of incremental files is greater than the threshold number of incremental files. In another embodiment, the second full image snapshot may be generated and uploaded to a data archival source in response to detecting that the amount of disk space for storing the first set of incremental files and the second set of incremental files has exceeded the threshold amount of disk space. In another embodiment, the second full image snapshot may be generated and uploaded to a data archival source in response to detecting that the combined file sizes of the first set of incremental files and/or the second set of incremental files has exceeded a threshold data size (e.g., has exceeded 1 TB). In another embodiment, the second full image snapshot may be generated and uploaded to a data archival source in response to detecting that the combined data size for the first set of incremental files and the second set of incremental files has exceeded a threshold fraction of a file size corresponding with the first full image snapshot. In one example, the first full image snapshot may comprise a file of size 1 TB and the second full image snapshot may be generated in response to detecting that the combined data size of the first set of incremental files and the second set of incremental files is greater than 50% of the file size for the first full image snapshot (i.e., the combined data size is greater than 500 GB if the first full image snapshot comprises 1 TB of data). In some cases, the second full image snapshot may be generated and uploaded to a data archival source in response to detecting that a combined data size associated with incremental files transmitted from a storage appliance to a remote storage appliance or transmitted to a first cloud-based data storage service has exceeded a threshold data size (e.g., is greater than 500 GB).

Figure 6A:
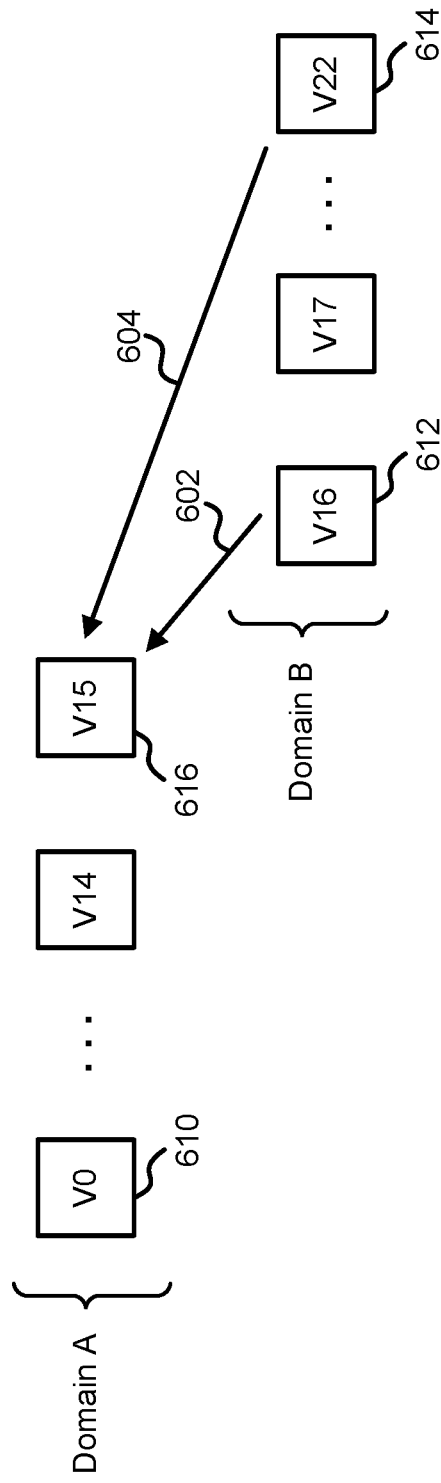

FIG. 6A depicts one embodiment of a first set of point in time versions of a virtual machine that have been stored using a first storage domain (Domain A) and a second set of point in time versions of the virtual machine that have been stored using a second storage domain (Domain B). The initial version of the virtual machine may correspond with version V0 of the virtual machine and the most recent version of the virtual machine may correspond with version V22 of the virtual machine. As depicted, the first 16 versions of the virtual machine corresponding with versions V0-V15 have been stored using the first storage domain and the last seven versions of the virtual machine corresponding with versions V16-V22 have been stored using the second storage domain. In order to transfer version V16 612 of the virtual machine from the second storage domain to the first storage domain, a first incremental file corresponding with the data differences 602 between version V16 612 and version V15 616 may be transferred from the second storage domain to the first storage domain. The first incremental file may comprise an in-order incremental file.

An incremental file may include the changed data blocks between two different versions of the virtual machine. The incremental file may be compressed prior to transmission to the first storage domain. The incremental file may have an associated fingerprint file that includes signatures for each of the changed data blocks. The signatures may be generated using a fingerprinting algorithm such as the Rabin fingerprint algorithm or a cryptographic hashing algorithm (e.g., MD5 or one of the SHA-family of algorithms). In one example, a virtual disk of the virtual machine may be partitioned into a plurality of blocks (e.g., blocks with 64 MB sizes) and signatures may be generated for each of the plurality of blocks.

In order to transfer the most recent version of the virtual machine from the second storage domain (e.g., a local storage appliance) to the first storage domain (e.g., a cloud-based data storage service), a second incremental file corresponding with the data differences 604 between version V22 614 and version V15 616 may be transferred from the second storage domain to the first storage domain. The second incremental file may comprise an out-of-order incremental file.

Figure 6B:
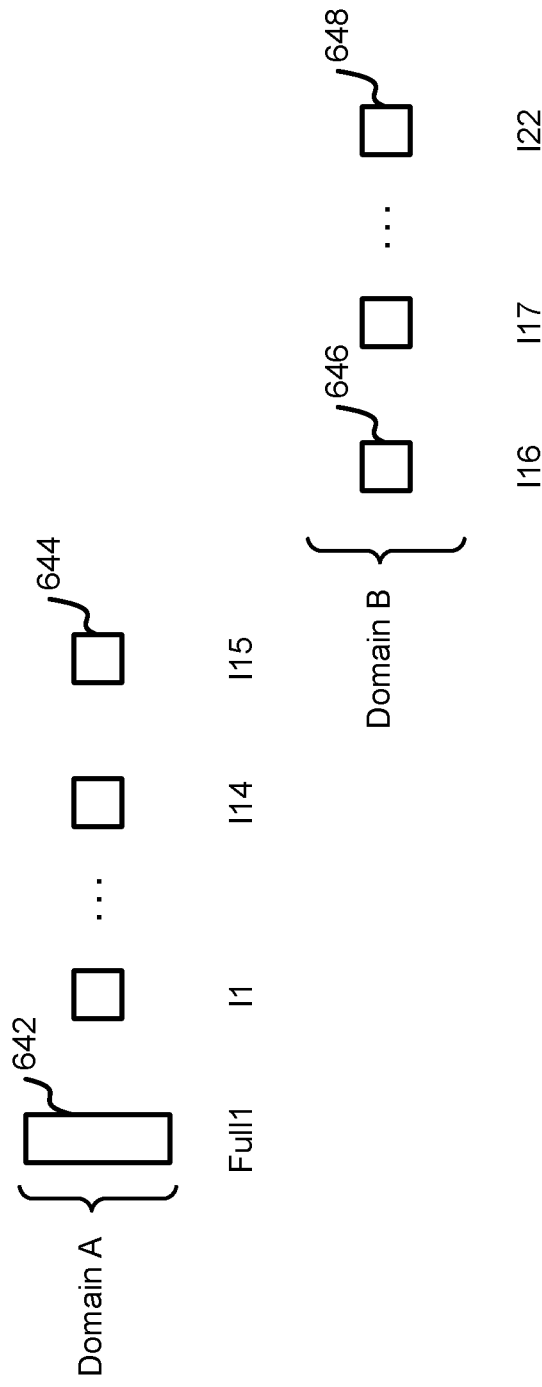

FIG. 6B depicts one embodiment of a first set of files stored in the first storage domain (Domain A) and a second set of files stored in the second storage domain (Domain B). The first set of files may correspond with the versions V0-V15 of the virtual machine depicted in FIG. 6A. The second set of files may correspond with the versions V16-V22 of the virtual machine depicted in FIG. 6A. The first full image snapshot 642 (Full1) may comprise a full image snapshot of version V0 610 of the virtual machine. The version V15 616 of the virtual machine may be generated by patching incremental file 644 (I15) to incremental files I1-I14 and the first full image snapshot 642. The version V16 612 of the virtual machine may correspond with incremental file 646 (I16), which may comprise data differences between version V15 616 and version V16 612 of the virtual machine. The version V22 614 of the virtual machine may correspond with incremental file 648 (I22), which may comprise data differences between version V22 614 and version V21 of the virtual machine.

FIG. 6C depicts one embodiment of the different versions of the virtual machine depicted in FIG. 6A in which an out-of-order incremental file has been transferred from the second storage domain to the first storage domain. FIG. 6D depicts one embodiment of two sets of files used for storing the versions of the virtual machine depicted in FIG. 6C within the two different data storage domains. Version V22 of the virtual machine now resides in both the first storage domain and the second storage domain due to the transfer of the out-of-order incremental file. Version V22 618 in the first storage domain of FIG. 6C may correspond with incremental file 652 (I22') in FIG. 6D and version V22 614 in the second storage domain of FIG. 6C may correspond with incremental file 648 (I22) in FIG. 6D. Version V22 618 in the first storage domain of FIG. 6C and version V22 614 in the second storage domain of FIG. 6C may comprise the same point in time version of the virtual machine. The version V22 618 of the virtual machine in the first storage domain may be generated by patching incremental files I1-I15 and I22' to the first full image snapshot 642. The version V22 614 of the virtual machine in the second storage domain may be generated by patching incremental files I1-I15 in the first storage domain and incremental files I16-I21 in the second storage domain to the first full image snapshot 642.

In one embodiment, on a periodic basis (e.g., every night at 11 PM), the most recent version of the virtual machine may be transferred from the second storage domain to the first storage domain. The most recent version of the virtual machine may be transferred to the first storage domain by identifying a version of the virtual machine that is stored within the first storage domain and determining an out-of-order incremental file corresponding with data differences between the version of the virtual machine stored within the first storage domain and the most recent version of the virtual machine stored within the second storage domain.

FIG. 6E depicts one embodiment of the different versions of the virtual machine depicted in FIG. 6C in which version V16 of the virtual machine has been transferred or archived from the second storage domain to the first storage domain. FIG. 6F depicts one embodiment of two sets of files used for storing the versions of the virtual machine depicted in FIG. 6E within the two different data storage domains. In one embodiment, an in-order incremental file corresponding with data differences between the version V16 622 of the virtual machine and version V15 616 of the virtual machine may be transferred from the second storage domain to the first storage domain. In another embodiment, an out-of-order incremental file corresponding with data differences between version V16 622 of the virtual machine and version V22 618 of the virtual machine may be transferred from the second storage domain to the first storage domain. The determination of whether to transfer the in-order incremental file or the out-of-order incremental file may depend on the file size or the data size for the incremental files. In one example, if the out-of-order incremental file comprises a smaller file size or a smaller data size than the in-order incremental file, then the out-of-order incremental file may be transferred to the first storage domain in order to conserve disk space within the first storage domain. In another example, if the in-order incremental file has a first file size and the out-of-order incremental file has a second file size, then the in-order incremental file may be transferred to the first storage domain if the first file size is less than the second file size. If the out-of-order incremental file is comparable in size or equal in size to the in-order incremental file, then it may be preferable to transfer the out-of-order incremental file as a later version of the virtual machine will likely expire later (e.g., version V22 618 of the virtual machine will likely expire after version V15 616 of the virtual machine expires).

Version V16 622 in the first storage domain of FIG. 6E may correspond with incremental file 654 (I16') in FIG. 6F. In one embodiment, the incremental file 654 (I16') may include data differences between version V16 622 of the virtual machine and version V22 618 of the virtual machine. The incremental file 654 may include one or more changed data blocks in which data changes occurred to the virtual machine between version V16 of the virtual machine and version V22 of the virtual machine. The version V16 622 of the virtual machine in the first storage domain may be generated by patching incremental files I1-I15, I22', and I16' to the first full image snapshot 642.

FIG. 6G depicts one embodiment of the different versions of the virtual machine depicted in FIG. 6E in which version V22 of the virtual machine has been transferred or archived from the second storage domain to the first storage domain. FIG. 6H depicts one embodiment of two sets of files used for storing the versions of the virtual machine depicted in FIG. 6G within the two different data storage domains. In one embodiment, an in-order incremental file corresponding with version V22 of the virtual machine has been transferred to the first storage domain.

Version V22 614 in the first storage domain of FIG. 6G may correspond with incremental file 662 (I22) in FIG. 6H. The incremental file 662 (I22) may include data differences between version V22 614 of the virtual machine and version V21 of the virtual machine. The incremental file 662 may include one or more changed data blocks in which data changes occurred to the virtual machine between version V21 of the virtual machine and version V22 of the virtual machine. The incremental file 652 (I22') in FIG. 6D may be deleted from the first storage domain. Versions V23-V29 of the virtual machine in FIG. 6G may correspond with incremental files I23-I29 stored using the second storage domain in FIG. 6H. The most recent snapshot of the virtual machine may comprise version V29 634 of the virtual machine that corresponds with incremental file 668 (I29). The next snapshot of the virtual machine to be transferred from the second storage domain to the first storage domain may comprise version V23 632 of the virtual machine that corresponds with incremental file 669 (I23). The in-order incremental file 664 (I16) in the first storage domain depicted in FIG. 6H may have replaced the out-of-order incremental file 654 (I16') in the first storage domain depicted in FIG. 6F.

FIG. 6I depicts one embodiment of the different versions of the virtual machine depicted in FIG. 6A in which version V22 of the virtual machine needs to be transferred from the second storage domain to the first storage domain prior to being archived. In some cases, a first incremental file corresponding with data changes or data differences 602 that occurred between version V15 616 of the virtual machine and V16 612 of the virtual machine and a second incremental file corresponding with data changes or data differences 674 that occurred between version V22 614 of the virtual machine and V16 612 of the virtual machine may be generated and transferred to the first storage domain.

FIG. 6J depicts one embodiment of the different versions of the virtual machine depicted in FIG. 6I in which version V16 676 and version V22 678 have been moved or transferred to the first storage domain. In one embodiment, the first incremental file corresponding with data differences 602 that occurred between version V15 616 of the virtual machine and V16 612 of the virtual machine may be transferred as a full image snapshot for version V16 of the virtual machine. The second incremental file corresponding with data differences 674 that occurred between version V22 614 of the virtual machine and V16 612 of the virtual machine may be transferred as an incremental snapshot for version V22 of the virtual machine. In another embodiment, both the first incremental file and the second incremental file may be transferred as incremental snapshot files. Both the first incremental file and the second incremental file may be concurrently generated and/or transferred to the first storage domain.

Figure 7A:
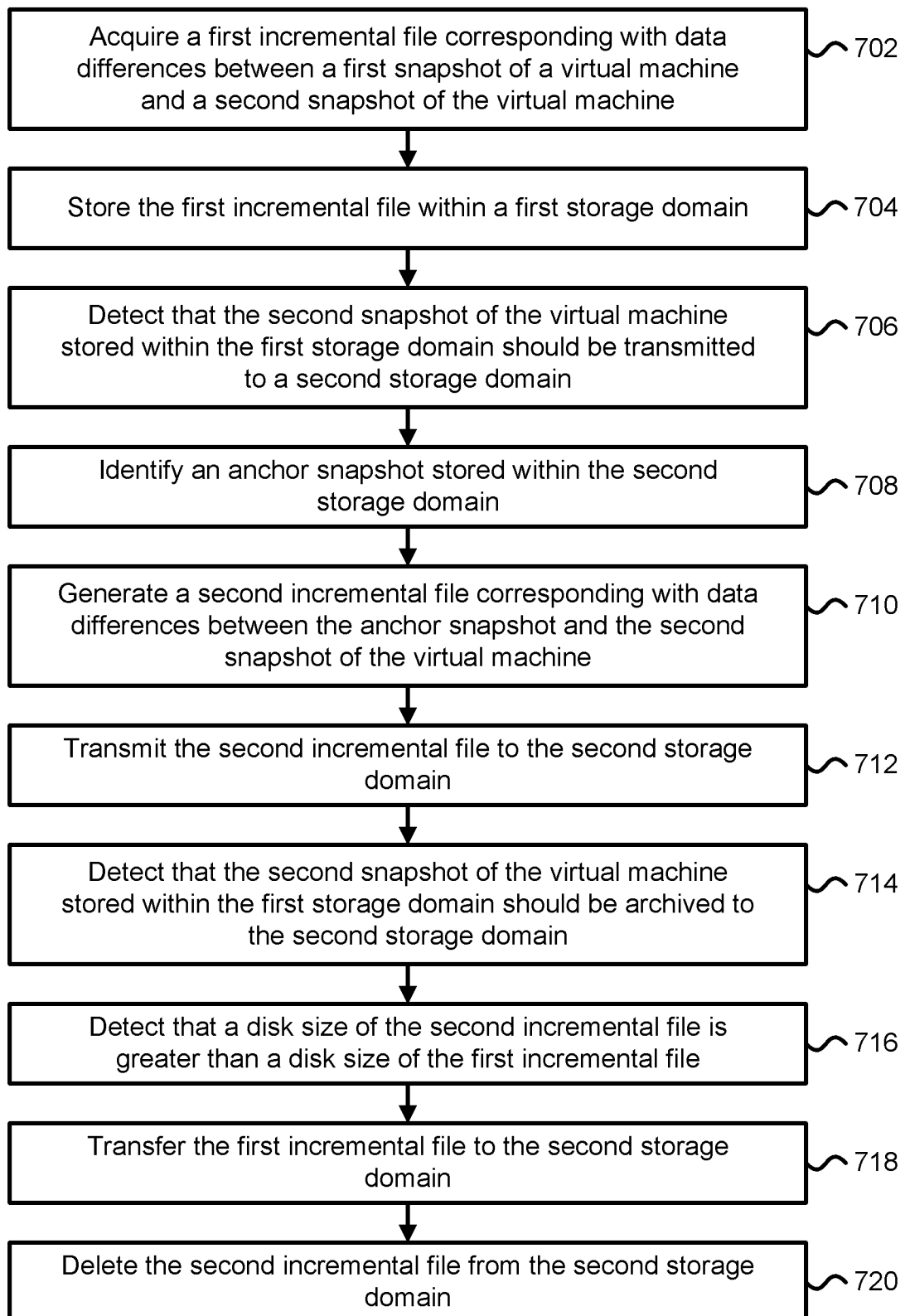
FIG. 7A is a flowchart describing one embodiment of a process for transferring snapshots of a virtual machine from a first storage domain to a second storage domain.

FIG. 7A is a flowchart describing one embodiment of a process for transferring snapshots of a virtual machine from a first storage domain to a second storage domain. In one embodiment, the process of FIG. 7A may be performed by a storage appliance, such as storage appliance 170 or storage appliance 140 in FIG. 1A. The process of FIG. 7A may also be performed using cloud-based computing resources or by generating and running virtual machines within a virtualized infrastructure.

In step 702, a first incremental file corresponding with data differences between a first snapshot of a virtual machine and a second snapshot of the virtual machine are acquired. The first incremental file may correspond with data differences between a first point in time version of the virtual machine and a second point in time version of the virtual machine that is captured or acquired subsequent to the first point in time. In step 704, the first incremental file is stored within the first storage domain. In step 706, it is detected that the second snapshot of the virtual machine stored within the first storage domain should be transmitted to a second storage domain. In one example, the second snapshot of the virtual machine may comprise the most recent snapshot of the virtual machine. In step 708, an anchor snapshot stored within the second storage domain is identified. In one example, the second snapshot of the virtual machine may correspond with version V22 614 of the virtual machine in FIG. 6A and the anchor snapshot may correspond with version V15 616 of the virtual machine in FIG. 6A. In one embodiment, the anchor snapshot stored within the second storage domain may be identified as the last uploaded snapshot to the second storage domain. In another embodiment, the anchor snapshot stored within the second storage domain may be identified as one of the last ten snapshots uploaded to the second storage domain in which the fewest number of changed blocks have occurred between a version of the virtual machine corresponding with the second snapshot and another version of the virtual machine corresponding with the anchor snapshot.

In step 710, a second incremental file corresponding with data differences between the anchor snapshot and the second snapshot of the virtual machine is generated. The second incremental file may correspond with incremental file 652 (I22') in FIG. 6D. The second incremental file may include one or more changed data blocks that changed between a first point in time version of the virtual machine associated with the anchor snapshot and a second point in time version of the virtual machine associated with the second snapshot. In some cases, the anchor snapshot may be acquired from the second storage domain prior to generating the second incremental file. In other cases, the anchor snapshot may reside within the first storage domain as the last updated snapshot transferred to the second storage domain may not have been deleted from the first storage domain.

In step 712, the second incremental file is transmitted to the second storage domain. In one example, the second incremental file may be electronically transferred from a local storage appliance to a remote storage appliance. In another example, the second incremental file may be electronically transferred from a local storage appliance, such as storage appliance 170 in FIG. 1A, to cloud-based data storage or cloud storage. In step 714, it is detected that the second snapshot of the virtual machine stored within the first storage domain should be archived to the second storage domain. In step 716, it is detected that a disk size of the second incremental file is greater than a disk size of the first incremental file. In step 718, the first incremental file is transferred to the second storage domain. The first incremental file may be transferred to the second storage domain in response to detecting that the disk size (or file size) of the second incremental file is greater than the disk size (or file size) of the first increment file and/or in response to detecting that the second snapshot of the virtual machine should be archived to the second storage domain. In step 720, the second incremental file is deleted from the second storage domain. In some cases, the second incremental file may be replaced by the first incremental file in order to reduce the amount of disk space required to store the second snapshot of the virtual machine within the second storage domain.

In some embodiments, on a periodic basis (e.g., every 24 hours), the most recent version of a virtual machine may be transferred to an archival data source (e.g., to cloud storage) prematurely in order to allow testing or development of the most recent version of the virtual machine to be performed directly from the archival data source. Over time, the most recent version of the virtual machine that was transferred to the archival data source will age and eventually be moved or archived from the first storage domain to the archival data source (or to a second storage domain) depending on an archival threshold (e.g., snapshots that are more than ten days old may be archived from the first storage domain to the archival data source). When it comes time to transfer the aged snapshot to the archival data source, a decision may be made to either keep the already transferred out-of-order incremental file for the aged snapshot or to transfer an in-order incremental file for the aged snapshot.

In one example, the in-order incremental file may be transferred to the second storage domain if a file size of the in-order incremental file is less than a file size of the out-of-order incremental file. By transferring the in-order incremental file to the first storage domain, a disk space reduction may occur by deleting the out-of-order incremental file from the first storage domain. In another example, if a threshold number of snapshots has occurred between the anchor snapshot and the second snapshot, then the in-order incremental file may be transferred to the second storage domain. In this case, as the out-of-order incremental file includes data changes relative to an earlier version of the virtual machine as compared with the in-order incremental file, transferring the in-order incremental file may allow additional expired snapshots to be deleted within the first storage domain. In another example, if a threshold time difference has occurred between the anchor snapshot and the second snapshot (e.g., the difference in time between the anchor snapshot and the second snapshot is more than one week), then the in-order incremental file may be transferred to the second storage domain.

Figure 7B:
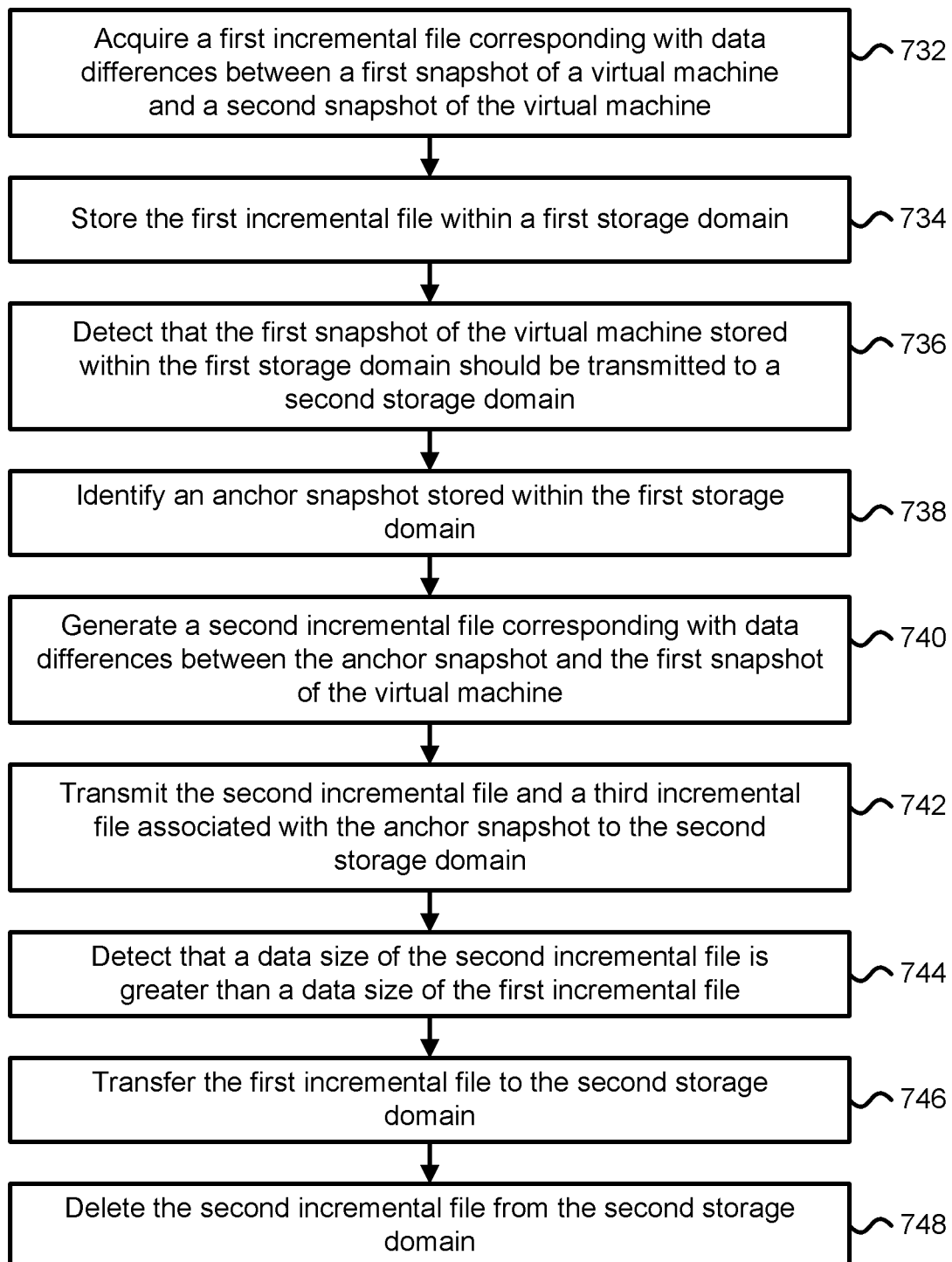
FIG. 7B is a flowchart describing another embodiment of a process for transferring snapshots of a virtual machine from a first storage domain to a second storage domain.

FIG. 7B is a flowchart describing another embodiment of a process for transferring snapshots of a virtual machine from a first storage domain to a second storage domain. In one embodiment, the process of FIG. 7B may be performed by a storage appliance, such as storage appliance 170 or storage appliance 140 in FIG. 1A. The process of FIG. 7B may also be performed using cloud-based computing resources or by generating and running virtual machines within a virtualized infrastructure.

In step 732, a first incremental file corresponding with data differences (or data changes) between a first snapshot of a virtual machine and a second snapshot of the virtual machine are acquired. In step 734, the first incremental file is stored within the first storage domain. In step 736, it is detected that the first snapshot of the virtual machine stored within the first storage domain should be transmitted to a second storage domain. In one example, the first snapshot of the virtual machine may comprise a recent snapshot of the virtual machine (e.g., the most recently captured snapshot of the virtual machine) that has not yet been archived or transferred to the second storage domain. The second storage domain may act as an archival data source. In step 738, an anchor snapshot stored within the first storage domain is identified. In one example, the anchor snapshot may be identified as the oldest snapshot stored within the first storage domain. In another example, the anchor snapshot may be identified as the next snapshot that is to be archived to the second storage domain.

In step 740, a second incremental file corresponding with data differences between the anchor snapshot and the first snapshot of the virtual machine is generated. In step 742, the second incremental file and a third incremental file associated with the anchor snapshot are transferred or transmitted to the second storage domain. In one example, the anchor snapshot may correspond with version V16 of the virtual machine in FIG. 6J and the first snapshot may correspond with version V22 of the virtual machine in FIG. 6J.

In step 744, it is detected that a data size of the second incremental file is greater than a data size of the first incremental file. In this case, an in-order incremental file corresponding with version V22 614 of the virtual machine in FIG. 6J may have a smaller file size or consume less disk space than an out-of-order incremental file corresponding with version V22 676 of the virtual machine in FIG. 6J. In step 746, the first incremental file is transferred to the second storage domain in response to detecting that the data size of the second incremental file is greater than the data size of the first incremental file. In step 748, the second incremental file is deleted from the second storage domain. In this case, transferring the first incremental file to the second storage domain and deleting the second incremental file from the second storage domain may free up disk space within the second storage domain.

One embodiment of the disclosed technology includes acquiring a first full image snapshot and a set of incremental files corresponding with different point in time versions of a virtual machine, storing the first full image snapshot and the set of incremental files, detecting that a data size for a first subset of the set of incremental files has exceeded a threshold data size, generating a second full image snapshot using the first full image snapshot and the first subset of the set of incremental files in response to detecting that the data size for the first subset of the set of incremental files has exceeded the threshold data size, and replacing a first incremental file of the first subset of the set of incremental files with the second full image snapshot.

One embodiment of the disclosed technology includes acquiring a first incremental file corresponding with data differences between a first snapshot of a virtual machine and a second snapshot of the virtual machine, storing the first incremental file within a first data storage domain, detecting that the first snapshot of the virtual machine should be transmitted to a second data storage domain different from the first data storage domain, identifying an anchor snapshot stored within the first data storage domain, generating a second incremental file corresponding with data differences between the anchor snapshot and the first snapshot of the virtual machine, and transmitting the second incremental file and a third incremental file associated with the anchor snapshot to the second data storage domain.

One embodiment of the disclosed technology includes a memory (e.g., a volatile or non-volatile memory) in communication with one or more processors. The memory configured to store a first full image snapshot and a set of incremental snapshots corresponding with different point in time versions of a virtual machine. The one or more processors configured to detect that a data size for a first subset of the set of incremental snapshots has exceeded a threshold data size and generate a second full image snapshot using the first full image snapshot and the first subset of the set of incremental snapshots in response to detection that the data size for the first subset of the set of incremental snapshots has exceeded the threshold data size. The one or more processors configured to store the second full image snapshot and delete a first incremental snapshot of the first subset of the set of incremental snapshots subsequent to the second full image snapshot being stored.

One embodiment of the disclosed technology includes a memory (e.g., a volatile or non-volatile memory) in communication with one or more processors. The memory configured to store a first incremental file corresponding with data differences between a first snapshot of a virtual machine and a second snapshot of the virtual machine. The one or more processors configured to detect that the first snapshot of the virtual machine should be transmitted from a first data storage domain to a second data storage domain and identify an anchor snapshot residing within the first data storage domain. The one or more processors configured to generate a second incremental file corresponding with data differences between the anchor snapshot and the first snapshot of the virtual machine and transmit the second incremental file and a third incremental file associated with the anchor snapshot to the second storage domain.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
detecting that an archival data source does not have access to compute resources;
acquiring a first full image snapshot and a set of incremental files corresponding with different point in time versions of a virtual machine;
storing the first full image snapshot and the set of incremental files;
detecting that a combined data size for expired snapshots within the archival data source has exceeded a threshold data size in response to detecting that the archival data source does not have access to compute resources;
determining that a second full image snapshot should be transferred to the archival data source instead of a first incremental file of the set of incremental files in response to detecting that the combined data size for the expired snapshots within the archival data source has exceeded the threshold data size;
generating the second full image snapshot using the first full image snapshot and a first subset of the set of incremental files that includes the first incremental file in response to determining that the second full image snapshot should be transferred to the archival data source instead of the first incremental file; and
transferring the second full image snapshot to the archival data source.

2. The method of claim 1, further comprising:
deleting the first incremental file of the first subset of the set of incremental files subsequent to transferring the second full image snapshot.

3. The method of claim 1, wherein:
the detecting that the combined data size for the expired snapshots within the archival data source has exceeded the threshold data size includes detecting that an aggregate data size of a set of previously transferred incremental files that were transferred to the archival data source prior to the generating the second full image snapshot has exceeded the threshold data size.

4. The method of claim 1, wherein:
the combined data size for the expired snapshots within the archival data source corresponds with an amount of disk space that may be reclaimed on the archival data source.

5. The method of claim 1, wherein:
the archival data source comprises cloud-based data storage.

6. The method of claim 1, further comprising:
detecting that the first subset of the set of incremental files corresponds with at least a threshold number of expired snapshots, the generating the second full image snapshot includes generating the second full image snapshot in response to detecting that the first subset of the set of incremental files corresponds with at least the threshold number of expired snapshots.

7. The method of claim 1, further comprising:
generating a consolidated incremental file by merging a second incremental file of the first subset of the set of incremental files and a third incremental file of the first subset of the set of incremental files;
storing the consolidated incremental file; and
deleting the second incremental file and the third incremental file subsequent to storing the consolidated incremental file.

8. The method of claim 1, further comprising:
receiving an instruction to generate a temporary virtual machine; and generating the temporary virtual machine, the temporary virtual machine performs the generating the second full image snapshot.

9. The method of claim 1, wherein:
the first incremental file corresponds with the most recent point in time version of the virtual machine for the different versions of the virtual machine corresponding with the first subset of the set of incremental files.

10. The method of claim 1, wherein:
the set of incremental files derives from the first full image snapshot.

11. A data management system, comprising:
a memory configured to store a first full image snapshot and a set of incremental snapshots corresponding with different point in time versions of a virtual machine; and
one or more processors configured to detect that an archival data source does not have access to compute resources and detect that a combined data size for expired snapshots within the archival data source has exceeded a threshold data size, the one or more processors configured to determine that a second full image snapshot should be transferred to the archival data source instead of a first incremental snapshot of the set of incremental snapshots in response to detection that the combined data size for the expired snapshots within the archival data source has exceeded the threshold data size and generate the second full image snapshot using the first full image snapshot and a first subset of the set of incremental snapshots that includes the first incremental snapshot in response to the determination that the second full image snapshot should be transferred to the archival data source instead of the first incremental snapshot, the one or more processors configured to transfer the second full image snapshot to the archival data source and delete the first incremental snapshot of the set of incremental snapshots subsequent to the second full image snapshot being transferred to the archival data source.

12. The data management system of claim 11, wherein:
the one or more processors configured to detect that an aggregate data size of a set of previously transferred incremental files that were transferred to the archival data source prior to the generation of the second full image snapshot has exceeded the threshold data size.

13. The data management system of claim 11, wherein:
the combined data size for the expired snapshots within the archival data source corresponds with an amount of disk space that may be reclaimed on the archival data source.

14. The data management system of claim 11, wherein:
the archival data source comprises a cloud-based data storage service.

15. The data management system of claim 11, wherein:
the one or more processors configured to detect that the first subset of the set of incremental snapshots corresponds with at least a threshold number of expired snapshots and generate the second full image snapshot in response to detection that the first subset of the set of incremental snapshots corresponds with at least the threshold number of expired snapshots.

16. The data management system of claim 11, wherein:
the one or more processors configured to consolidate a second incremental snapshot of the first subset of the set of incremental snapshots with a third incremental snapshot of the first subset of the set of incremental snapshots.

17. The data management system of claim 11, wherein:
the one or more processors configured to generate a temporary virtual machine to perform the generation of the second full image snapshot.

18. The data management system of claim 11, wherein:
the first incremental snapshot corresponds with the most recent point in time version of the virtual machine within the first subset of the set of incremental snapshots.

19. The data management system of claim 11, wherein:
the set of incremental snapshots derives from the first full image snapshot.

20. One or more storage devices containing processor readable code for programming one or more processors to perform a method for operating a data management system, the processor readable code comprising:
processor readable code configured to detect that an archival data source does not have access to compute resources;
processor readable code configured to acquire a first full image snapshot and a set of incremental files corresponding with different point in time versions of a virtual machine;
processor readable code configured to store the first full image snapshot and the set of incremental files;
processor readable code configured to detect that a combined data size for expired snapshots within the archival data source has exceeded a threshold data size in response to detection that the archival data source does not have access to compute resources;
processor readable code configured to determine that a second full image snapshot should be transferred to the archival data source instead of a first incremental file of the set of incremental files in response to detection that the combined data size for the expired snapshots within the archival data source has exceeded the threshold data size;
processor readable code configured to generate the second full image snapshot using the first full image snapshot and the first subset of the set of incremental files that includes the first incremental file in response to the determination that the second full image snapshot should be transferred to the archival data source instead of the first incremental file; and
processor readable code configured to transfer the second full image snapshot to the archival data source and delete the first incremental file of the set of incremental files subsequent to the second full image snapshot being transferred to the archival data source.

* * * * *

UNITED STATES PATENT AND TRADEMARK OFFICE
CERTIFICATE OF CORRECTION

PATENT NO. : 10,528,521 B2
APPLICATION NO. : 15/866261
DATED : January 7, 2020
INVENTOR(S) : Agarwal et al.

Page 1 of 1

It is certified that error appears in the above-identified patent and that said Letters Patent is hereby corrected as shown below:

In the Specification

In Column 29, Line 53, delete "(12')" and insert --(I2')-- therefor

In Column 37, Line 48, delete "(122')" and insert --(I22')-- therefor

In Column 37, Line 50, delete "(122)" and insert --(I22)-- therefor

In Column 42, Line 5, delete "676" and insert --678-- therefor

Signed and Sealed this
First Day of September, 2020

Andrei Iancu
*Director of the United States Patent and Trademark Office*